United States Patent [19]

Papa et al.

[11] 4,009,129
[45] Feb. 22, 1977

[54] COPOLYMERS OF CYCLIC VINYL ETHERS AND CYCLIC ACETALS

[75] Inventors: Anthony Joseph Papa, St. Albans; William Robert Proops, Charleston, both of W. Va.

[73] Assignee: Union Carbide Corporation, New York, N.Y.

[22] Filed: May 5, 1975

[21] Appl. No.: 574,710

Related U.S. Application Data

[62] Division of Ser. No. 392,497, Aug. 29, 1973, Pat. No. 3,893,985, which is a division of Ser. No. 146,843, May 25, 1971, Pat. No. 3,784,594.

[52] U.S. Cl. .......................... 260/2.5 F; 260/2.5 N
[51] Int. Cl.² .......................................... C08J 9/00
[58] Field of Search ...................... 260/2.5 F, 2.5 N

[56] References Cited
UNITED STATES PATENTS

| | | |
|---|---|---|
| 3,306,877 | 2/1967 | Schott et al. ................ 260/2.5 F X |
| 3,547,837 | 12/1970 | Ashikaga et al. ............... 260/2.5 F |
| 3,663,470 | 5/1972 | Nishimura et al. ............. 260/2.5 F |
| 3,673,125 | 6/1972 | Takahashi et al. ............. 260/2.5 F |
| 3,737,398 | 6/1973 | Yamaguchi ..................... 260/2.5 F |

*Primary Examiner*—Lucille M. Phynes
*Attorney, Agent, or Firm*—Marylin Klosty

[57] ABSTRACT

Novel copolymerization products are provided by the cationic polymerization of a di-(dihydropyranyl) compound with a substituted 1,3-dioxolane or a substituted 1,3-dioxane. The copolymerization products possess improved abrasion resistance and toughness as compared with the homopolymers of the di-(dihydropyranyl) monomers. Especially useful, particularly in providing foamed polymeric materials of improved friability resistance, are the polymerization reaction products of 3,4-dihydro-2H-pyran-2-methyl(3,4-dihydro-2H-pyran-2-carboxylate) and a bis-dioxolanyl or a bis-dioxanyl carbamate.

14 Claims, No Drawings

COPOLYMERS OF CYCLIC VINYL ETHERS AND CYCLIC ACETALS

This is a division of application Ser. No. 392,497, filed Aug. 29, 1973, now U.S. Pat. No. 3,893,985, issued July 8, 1975. This latter application was filed under Rule 60 and which is a division of application Ser. No. 146,843, filed May 25, 1971, now U.S. Pat. No. 3,784,594, granted Jan. 8, 1974.

This invention relates generally to oxygen-heterocyclic compounds and to polymeric materials obtained therefrom. More particularly, the invention relates to new and improved polymeric compositions, including foamed polymeric materials, obtained by copolymerization of a compound containing a dihydropyranyl cyclic nucleus and a particular class of cyclic acetals.

BACKGROUND OF THE INVENTION

The homopolymerization of cyclic vinyl ethers and copolymerization with certain classes of monomers is known to the art. One such cyclic vinyl ether is 3,4-dihydro-2H-pyran-2-methyl(3,4-dihydro-2H-pyran-2-carboxylate) which is commonly referred to as acrolein tetramer and has the structure:

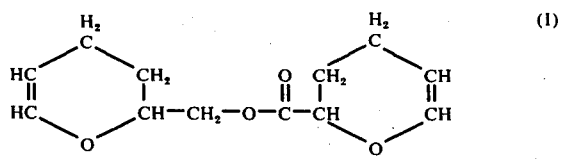

The polymerization of this compound and its 2,5-dialkyl substituted derivatives is reported in U.S. Pat. No. 2,537,921 wherein the homopolymers are described as having excellent thermostability and resistance to water and solvents. Generally, however, such polymers tend to be brittle compositions. Among the many classes of comonomers which the patentee enumerates are unsaturated ethers and esters such as vinyl alkyl ethers, vinyl esters of carboxylic acids and other compounds containing polymerizable carbon-to-carbon double bonds none of which, however, are oxygen-heterocyclic compounds. Subsequent to the aforesaid patent, it was reported that divinyl ethers, and particularly the aforesaid di-(dihydropyranyl) compound (I) and bis-(dihydropyranyl) compounds, were capable of providing rigid, cellular polymeric products. Such products, which are referred to in the art as pyranyl-based foams, and their preparation, are reported in U.S. Pat. Nos. 3,311,574; 3,311,575; 3,318,824; and British Pat. No. 991,970. Notwithstanding the useful properties which pyranyl-based polymeric compositions possess, one property which detracts from and hinders their widespread commercial application is their poor friability resistance. In particular, Compound I which, from the standpoint of availability and relatively low cost, is the most attractive of the dipyranyl monomers, provides brittle and highly friable homopolymers and foamed polymeric products, although some improvement in friability is obtained by polymerization thereof in the presence of a phenolic compound such as 2,2-bis(4-hydroxyphenyl)-propane (Bisphenol-A).

It is an object of this invention, therefore, to provide new and improved polymeric compositions derived from cyclic vinyl ethers and, in particular, polymeric compositions derived from compounds containing a dihydropyranyl ring nucleus.

Another object is to provide new compositions of matter which are copolymerizable with dihydropyranyl compounds to produce products of improved friability resistance.

A further object is to provide improved foam formulations comprising, and improved polymeric foams derived from, 3,4-dihydro-2H-pyran-2-methyl (3,4-dihydro-2H-pyran-2-carboxylate).

Various other objects and advantages of this invention will become apparent to those skilled in the art from the accompanying description and disclosure.

In accordance with the present invention, the above objects are generally accomplished by providing polymeric compositions which comprise the polymerization reaction products of a di-(dihydropyranyl) compound and an oxygen-heterocyclic compound comprising at least one cyclic nucleus containing two oxygen atoms and from 3 to 4 carbon atoms arranged to provide a cyclic nucleus represented herein by the symbol D which has the following structure:

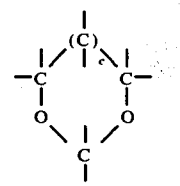

wherein $c$ has a value of zero or one as in the cyclic acetals, 1,3-dioxolanes and 1,3-dioxanes, respectively. One class of cyclic acetals which are employed in this invention are compounds containing only one of the aforesaid 1,3-dioxolanyl or 1,3-dioxanyl rings (referred to herein as monofunctional compounds) and having a hydroxyl-substituted monovalent organic radical bonded thereto. A second class of cyclic acetals are the difunctional 1,3-dioxolanes and 1,3-dioxanes (that is, compounds having two 1,3-dioxolanyl or 1,3-dioxanyl rings) and in which the respective dioxolanyl and dioxanyl rings are linked through a bivalent hydrocarbon group or a hydroxyl-substituted bivalent organic radical. A third class of suitable cyclic monomers for use in the present invention are the reaction products obtained by reacting the aforesaid hydroxyl-containing mono- or di-functional cyclic acetals with a dicarboxylic acid or an organic polyisocyanate, the polyisocyanate derivatives constituting new compositions of matter. A fourth class of cyclic acetals for use in the present invention are compounds in which one carbon atom of the aforesaid cyclic nucleus (D) in common to either a second cyclic nucleus (D) or a cycloaliphatic hydrocarbon nucleus, thereby providing spiro compounds containing from one to two 1,3-dioxolanyl or 1,3-dioxanyl rings.

In accordance with one embodiment of the process of the present invention, the aforesaid di-(dihydropyranyl) and cyclic acetals are copolymerized in a reaction medium comprising a cationic polymerization catalyst to provide polymeric products which are useful thermoset resins. In accordance with another embodiment of the process described herein, the aforesaid compounds are copolymerized in the presence of a cationic polymerization catalyst under conditions such that polymeric foams are produced.

THE DI-(DIHYDROPYRANYL) MONOMER

The di-(dihydropyranyl) compounds employed in the present invention comprise two 3,4-dihydro-2H-pyranyl rings which are interconnected by a linking chain bonded at either end to the 2-position of the respective pyranyl rings. In simplified form, the preferred compounds for use in the present invention have the following general Formula A:

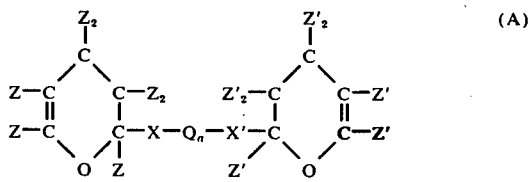

wherein:

Z and Z' each represents hydrogen or an alkyl group having from 1 to 10, and usually no more than 6, carbon atoms;

X and X' are members of the class consisting of a bivalent saturated hydrocarbon group, R, having the structure, $-C_nH_{2n}-$, wherein $n$ is an integer having a value of from 1 to 10; an oxy radical, $-O-$; and a carbonyl group, $-C(O)-$; and, in addition, X' may be a carbonyloxy group, $-O(O)C-$, the carbon atom of which is bonded to the 2-position of the dihydropyranyl ring; X and X' may be the same or different provided that taken together they contain either zero or 2 oxygen atoms;

$a$ has a value of from zero to 1, $a$ being zero only when X' is the aforesaid carbonyloxy group;

Q is a member of the class consisting of the aforesaid R group; a dioxyalkylene group, $-ORO-$, wherein R is as defined above; a dicarboxylate group, $-OC(O)-R'-C(O)O,-$ wherein R' is the nucleus of a dicarboxylic acid; and a polycarbamate group such as the dicarbamate group, $-OC(O)NH-R''-NHC(O)O-$, wherein R'', as illustrated, is the nucleus of a diisocyanate; and X, X' and Q taken together is such that the linking chain, $-X-Q-X'-$, contains an even number of oxygen atoms from two to four, provided that when X and X' are both oxy radicals, the linking chain contains no other oxygen atoms (that is, Q or R), and when X and X' are both carbonyl groups, the linking chain contains four oxygen atoms (that is, Q is $-ORO-$).

Among the suitable di-(dihydropyranyl) compounds which are copolymerized with the cyclic acetals in accordance with the teachings of this invention are the following classes of compounds designated by Formulas A-1 through A-6 below.

1. 3,4-dihydro-2H-pyran-2-methyl(3,4-dihydro-2H-pyran-2-carboxylates) having the formula:

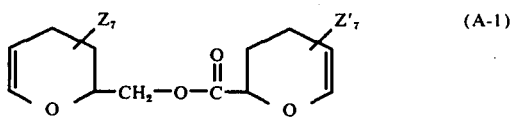

wherein Z and Z' are as above-defined. Preferably a total of from 5 to 7 of the respective Z and Z' groups are hydrogen and correspondingly, from 2 to zero are alkyl groups. When Z and Z' are alkyl groups, they are usually bonded to the 2- and/or 5-position of the respective rings. Typical examples of this class of reactants are: 3,4-dihydro-2-H-pyran-2-methyl(3,4-dihydro-2H-pyran-2-carboxylate) and corresponding alkyl-substituted compounds such as 3,4-dihydro-2,5-dimethyl-2H-pyran-2-methyl(3,4-dihydro-2,5-dimethyl-2H-pyran-2-carboxylate); 3,4-dihydro-2,5-diisobutyl-2H-pyran-2-methyl(3,4-dihydro-2,5-diisobutyl-2H-pyran-2-carboxylate); 3,4-dihydro-2,5-dihexyl-2H-pyran-2-methyl(3,4-dihydro-2,5-dihexyl-2H-pyran-2-carboxylate); and 3,4-dihydro-2,5-didecyl-2H-pyran-2-methyl(3,4-dihydro-2,5-didecyl-2H-pyran-2-carboxylate).

2. Alkanedioxy-bis(3',4'-dihydro-2'H-pyran-2'-carbonyl) compounds having the structure:

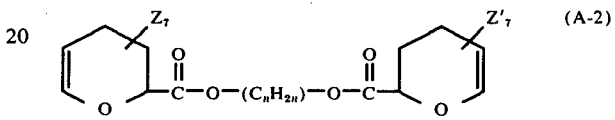

wherein Z and Z' are as above-discussed, and $n$ is an integer from 1 to 10, preferably from 1 to 4. Typical examples of such compounds which are suitable in the practice of this invention are: 1,2-ethanedioxybis-(3',4'-dihydro-2'H-pyran-2'-carbonyl); 1,2-ethanedioxybis-(3',4'-dihydro-5'-methyl-2'H-pyran-2'-carbonyl), and corresponding 1,2-isopropanedioxy and 1,4-butanedioxy compounds. Such compounds are prepared by the reaction of an alkylene dihalide, X'λ'$-(C_nH_{2n})-$X'', wherein $n$ is as aforesaid, and X'' is halogen, particularly iodine, chlorine or bromine, with the silver salt of a 3,4-dihydro-2H-pyran-2-carboxylic acid. The latter salts are in turn prepared by the oxidation of 3,4-dihydro-2H-pyran-2-carboxaldehyde in the presence of a silver salt such as silver oxide, preferably in an anhydrous medium containing an organic solvent such as benzene, as described in U.S. Pat. No. 2,514,172.

3. Bis-(3',4'-dihyro-2'H-pyran-2'-oxy)alkanes having the formula:

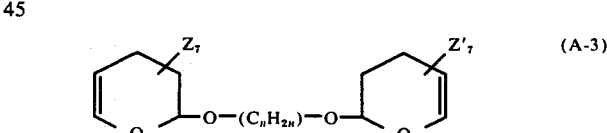

wherein Z, Z' and $n$ have the significance discussed above. Illustrative compounds of this group of di-(dihydropyranyl) compounds are: 1,2-bis-(3',4'-dihydro-2'H-pyran-2'-oxy)ethane; 1,2-bis(3',4'-dihydro-5'-methyl-2'H-pyran-2'-oxy)ethane; 1,3-bis(3',4'-dihydro-5'-methyl-2'H-pyran-2'-oxy)propane; and 1,4-bis(3',4'-dihydro-2'H-pyran-2'oxy)butane. Such compounds are prepared by Diels-Alder addition reactions of divinyl bis-ethers such as the divinyl ethers of alkylene glycols, with alpha, beta-unsaturated aldehydes such as acrolein and methacrolein under conditions described, for example, by Curtis W. Smoth et al., *Journal of the American Chemical Society*, Vol. 73, 5267 (1951). For example, the reaction between a mole of ethylene glycol divinyl ether and 2 moles of acrolein provides 1,2-bis(3',4'-dihydro-2'H-pyran-2'-oxy)ethane.

4. Bis-(3',4'-dihydro-2'H-pyran-2'-alkoxy)alkanes having the formula:

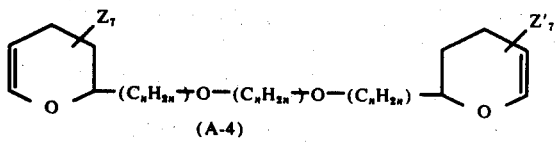

(A-4)

wherein Z, Z' and n are as defined hereinabove. Typical examples of this type of reactant are: 1,1-bis(3',4'-dihydro-2'H-pyran-2'-methoxy)ethane; 1,1-bis(3',4'-dihydro-5'-methyl-2'H-pyran-2'-methoxy)ethane; and 1,2-bis(3',4'-dihydro-2'H-pyran-2'-methoxy)ethane. Such compounds are prepared by the addition of alpha,beta-unsaturated aldehydes (such as, for example, acrolein and methacrolein) to the corresponding bis-unsaturated ethers.

5. Bis-(3',4'-dihydro-2'H-pyran-2'-alkyl)carboxylates having the general formula:

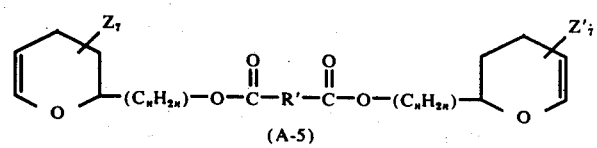

(A-5)

wherein Z, Z' and n are as above-defined; and R' is the nucleus of a dicarboxylic acid and may be a bivalent aliphatic, cycloaliphatic or aromatic nucleus including corresponding halogen-substituted nuclei. Thus, R' may be: a bivalent alkylene group, $-(C_n° H_{2n°})-$, wherein $n°$ is an integer of from 1 to 10 as in the saturated acyclic dibasic acid series, $HOOC-(CH_2-)_{n°}-COOH$; an alkenylene group having from 2 to 10 carbon atoms as in maleic acid and itaconic acid; an arylene group as in phthalic, isophthalic and terephthalic acids; an aralkylene nucleus as in homophthalic acid; cycloaliphatic nuclei as in the hydrophthalic acids including di-, tetra-, and hexa-hydrophthalic acids, and bicyclo[2.2.1]hept-5-ene-2,3-dicarboxylic acid; and corresponding halogenated nuclei as in chloromaleic acid, tetrachloro- and tetrabromophthalic acids and chlorobicyclo-[2.2.1]-hept-5-ene-2,3-dicarboxylic acids such as chlorendic acid. Specific examples of this class of compounds are: bis-(3,4-dihydro-2H-pyran-2-methyl)-succinate, -adipate, -azelate, -sebacate, -tetrachlorophthalate, -tetrabromophthalate and -chlorendate. This type of reactant is prepared by the condensation of 3,4-dihydro-2H-pyranyl-2-alkanols with the dibasic acid or acid halide of the dibasic acid.

6. Poly-(3',4'-dihydro-2'H-pyran-2'-alkyl) carbamates which comprise the reaction products formed by condensation of 3,4-dihydro-2H-pyranyl-2-carbinols and an organic polyisocyanate such as those described below. Among the suitable polyisocyanates which may be used in the preparation of such monomers for use in the present invention are those having the formula, $R''(NCO)_i$, wherein i is an integer of two or more and R'' is an organic radical having the valence of i. R'' can be an aliphatic, cycloaliphatic or aromatic radical which may be unsubstituted hydrocarbyl groups or hydrocarbyl groups substituted, for example, with halogen or alkoxy groups. Thus, when i is two, for example, R'' is a bivalent substituted or unsubstituted hydrocarbon group such as alkylene, cycloalkylene, arylene, alkyl-substituted cycloalkylene, alkarylene, aralkylene and like groups. Typical examples of such polyisocyanates are: 1,6-hexamethylene diisocyanate; 1,4-tetramethylene diisocyanate; 1-methyl-2,4-diisocyanatocyclohexane; bis(4-isocyanatophenyl) methane; phenylene diisocyanates such as 4-methoxy-1,3-phenylenediisocyanate, 5,6-dimethyl-1,3-phenylenediisocyanate, 2,4-and 2,6- tolylene diisocyanates, crude tolylene diisocyanate, 6-isopropyl-1,3-phenylenediisocyanate, durylene diisocyanate, triphenylmethane-4,4',4''-triisocyanate, and many other organic polyisocyanates that are known in the art such as those disclosed in an article by Siefkin, Ann. 565,75 (1949). Also included as useful in the preparation of the carbamate monomers employed in this invention are the polyisocyanates of the anilineformaldehyde poly-aromatic type which are produced by phosgenation of the polyamine obtained by acid-catalyzed condensation of aniline with formaldehyde. Polyphenylmethylene polyisocyanates of this type are available commercially under such trade names as PAPI, AFPI, Mondur MR, Isonate 390P, NCO-120 and NCO-20. The products are low viscosity (50–500 centipoises at 25° C.) liquids having average isocyanato functionalities in the range of about 2.25 to about 3.2 or higher, depending upon the specific aniline-to-formaldehyde molar ratio used in the polyamine preparation. Other useful polyisocyanates are combinations of diisocyanates with polymeric isocyanates containing more than two isocyanate groups per molecule. Illustrative of such combinations are: a mixture of 2,4-tolylene diisocyanate, 2,6-tolylene diisocyanate and the aforesaid polyphenylmethylene polyisocyanates; and a mixture of isomeric tolylene diisocyanates with polymeric tolylene diisocyanates obtained as residues from the manufacture of the diisocyanates.

When the isocyanate which is reacted with the 3,4-dihydro-2H-pyran-2-carbinol contains two isocyanato functions, bis-(3',4'-dihydro-2'H-pyran-2-alkyl) dicarbamates are formed having the general formula:

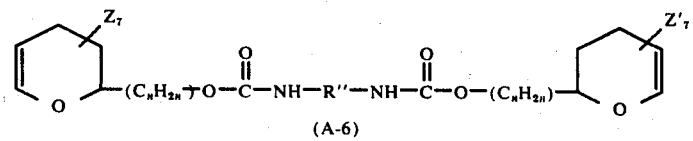

(A-6)

wherein Z, Z' and n are as defined hereinabove; and R'' corresponds to the R'' nucleus of the isocyanate reactant, $R''(NCO)_i$ when i is two. It is to be understood that when the isocyanate has an isocyanato function greater than two, the pyranyl monomer will have a corresponding average number of carbamate groups and the general formula:

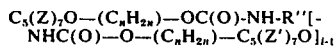

wherein $C_5(Z)_7O$ and $C_5(Z')_7O$ are the respective 3,4-dihydro-2H-pyranyl rings. Typical examples of this class of di-(dihydropyranyl) compounds are toluene-2,4-(or 2,6)-(bis-3',4'-dihydro-2'H-pyran-2'-methyl) carbamate, and the reaction products of 3,4-dihydro-2'H-pyranyl-2-carbinol with the aforesaid polymeric liquids having an average isocyanato function of about 2.25 to about 3.2.

THE CYCLIC ACETAL MONOMERS

The 1,3-dioxolanes and 1,3-dioxanes employed in the process of this invention and which are copolymerized with the above-described pyranyl compounds, have the following general Formula B:

                                  B wherein:
$e$ and $f$ represent numbers having a value of from zero to one, the sum $e+f$ being one;
D represents the aforesaid cyclic nucleus,

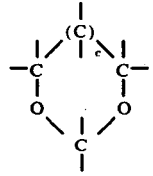

where $c$ is a number having a value of from zero to one, D being a 1,3-dioxolanyl ring when $c$ is zero and a 1,3-dioxanyl ring when $c$ is one;
D' represents a cyclic nucleus having from five to seven members and is of the class consisting of a cyclic hydrocarbon nucleus and an oxygen-heterocyclic nucleus corresponding to the aforesaid 1,3-dioxolanyl or 1,3-dioxanyl nucleus (D), one carbon atom of D' being common to cyclic nucleus D of general Formula B and forming a spiro compound therewith; and
S designates a monovalent radical as defined in detail below with respect to general Formula B' and, when present, is bonded to a carbon atom of cyclic nucleus D.
In the aforesaid general Formula B, when $e$ is one (and thus $f$ is zero), all but one of the valences of the carbon atoms of the 1,3-dioxolanyl or 1,3-dioxyanyl ring (D) are satisfied by monovalent substituents (S') of the class consisting of hydrogen, alkyl, aryl, alkaryl, aralkyl, haloalkyl, cycloalkyl, alkenyl, cycloalkenyl, bicycloalkenyl, alkoxy, aryloxy and carbalkoxy. The unsatisfied valence is the valence through which the cyclic nucleus (D) is linked to the remainder of the compound, that is, to the monovalent radical, S. On the other hand, when $f$ of general Formula B is one (and thus $e$ is zero), all but two valences of a single carbon atom of the cyclic nucleus (D) are satisfied by one of the aforesaid monovalent substituents (S') and the remaining two unsatisfied valences of said single carbon atom form a spiro compound with the cyclic nucleus, D'. The remaining valences of D' may also be satisfied by the aforesaid monovalent substituents, S'. When S' is one of the aforesaid organic radicals, it may contain from 1 to 16 carbon atoms per radical, and preferably has not more than 10 carbon atoms. When two organic radicals (S') are bonded to the same carbon atom, they are usually lower alkyl, lower haloalkyl, or lower alkoxy (that is, radicals having from 1 to 4 carbon atoms), or lower alkenyl groups (that is, radicals having from 2 to 4 carbon atoms).

When $f$ of the general Formula B is zero, the cyclic acetal monomers employed in this invention have the formula, D—S, wherein S is a monovalent radical having the stucture shown within brackets in the following Formula B':

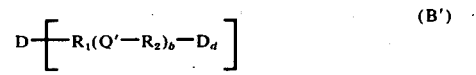                    (B')

wherein:
D represents a 1,3-dioxolanyl or 1,3-dioxanyl ring all but one of the carbon atoms of which are bonded to the aforesaid S' radicals, as described above;
$b$ and $d$ each represents a number having a value from zero to one, $b$ being one only when $d$ is one;
$R_1$ is either a monovalent or divalent group depending upon the value of $d$; thus, when $d$ is zero (and thus $b$ is also zero), $R_1$ is the monovalent hydroxyalkyl group, $-C_mH_{2m}(OH)$, wherein the —OH group may be a primary, secondary or tertiary hydroxyl; and, when $d$ is one and $b$ is either zero or one, $R_1$ is a bivalent alkylene group having the formula, $-C_mH_{2m-w}Y_w-$, wherein $w$ has a value of zero to one and the definition of Y, when present (that is, when $w$ is one), depends upon the value of $b$; thus, when $b$ is zero, Y is a hydroxyl group, and, when $b$ is one, Y is the cyclic nucleus, D; in each instance, $m$ represents an integer having a value of from 1 to 16 and is preferably from 1 to 10;
$Q'$ represents the dicarboxylate group, $-OC(O)-R^\circ-C(O)O-$, or the polycarbamate group, $-OC(O)-NH-R^{\infty}[-NH-C(O)O-]_{i-1}$, wherein $R^\circ$ and $R^{\infty}$ are, respectively, the nucleus of a dicarboxylic acid and the nucleus of an organic polyisocyanate having $i$ number of isocyanato groups, $i$ being at least two;
$R_2$ is the same as $R_1$ when $d$ is one and, of course, when $b$ is one; that is, $R_2$ has the formula, $-C_mH_{2m-w}Y_w-$, wherein $m$ and $w$ are as above-defined and Y, when present, is the cyclic nucleus D. Among the suitable 1,3-dioxolanes and 1,3-dioxanes encompassed by the above general Formula B and which are employed in the present invention are the following sub-classes designated as Compounds B'-1 through B'-8.

1. Hydroxyalkyl-mono-1,3-dioxolanes and and -1,3-dioxanes, that is, compounds wherein $d$ of the general Formula B' is zero (and thus $b$ is also zero) and $R_1$ is, therefore, a hydroxyalkyl group. This particular class of compounds has the formula:

                     B'-1 wherein a carbon atom of the $-C_mH_{2m}-$ group is bonded to either the 2-, 4-, or 5-position of cyclic nucleus D, and the remaining carbon atoms of D are bonded to one of the aforesaid substituents, S', including hydrogen.

A preferred class of hydroxyalkyl-1,3-dioxolanes and hydroxyalkyl-1,3-dioxanes for use in the practice of this invention are compounds having the following formulas, respectively:

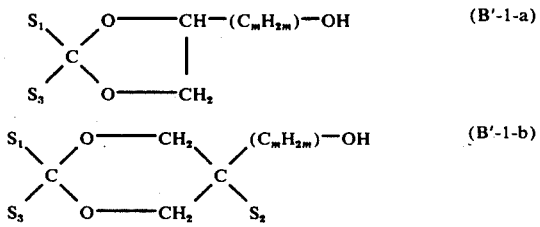

wherein the value of $m$ is preferably from 1 to 10; the substituents, $S_1$ and $S_2$, may be the same or different and are members of the class consisting of hydrogen and an alkyl group preferably having from 1 to 10, and most preferably from 1 to 4 carbon atoms; and the substituent, $S_3$, is a member of the class consisting of $S_1$ (or $S_2$), an alkenyl group preferably having from 2 to 10 carbon atoms and a dihaloalkyl group preferably having from 2 to 10 carbon atoms. Of these, the particularly preferred monomers are those wherein $S_3$ is an alkenyl group of 2 to 4 carbon atoms such as a vinyl or isopropenyl group.

Typical examples of monomers encompassed by general formula B' are: 2,2-dimethyl- and 2,2-diethyl-4-hydroxymethyl-1,3-dioxolanes; 2,2-dimethyl- and 2,2-dipropyl-4-(4-hydroxybutyl)-1,3-dioxolanes; 2-vinyl-4-hydroxymethyl-1,3-dioxolane; 2-vinyl-4-(4-hydroxybutyl)-1,3-dioxolane; 2-vinyl-4-(omega-hydroxyoctyl)-5-octyl-1,3-dioxolane; 2-isopropenyl-4-(4-hydroxybutyl)-1,3-dioxolane; 2-(1,2-dichloroethyl)-4-(4-hydroxybutyl)-1,3-dioxolane; 2-vinyl-5-hydroxymethyl-5-methyl-1,3-dioxane; 2-isopropenyl-4-ethyl-4-(omega-hydroxypentyl)-1,3-dioxane; 2-vinyl-4-(omega-pentylhydroxy)-1,3-dioxane; and 2-phenyl-4-hydroxymethyl-1,3-dioxolane.

This class of reactants are obtained by the reaction of ketones or aldehydes with triols by conventional acid-catalyzed reactions. For example, in producing the 2,2-dialkyl-substituted hydroxymethyl-1,3-dioxolanes, ketones such as acetone, diethyl ketone, dipropyl ketone and the like are condensed with the triol, glycerol, in the presence of an acid catalyst such as para-toluenesulfonic acid. In producing the 1,3-dioxolanes containing a 4-hydroxybutyl substituent in the four position of the ring, the ketone or aldehyde is reacted with 1,2,6-hexanetriol. When an unsaturated aldehyde such as acrolein or methacrolein are reacted with the triol, an alkenyl substituent such as vinyl and isopropenyl groups are introduced to the cyclic nucleus. For example, 2-vinyl-5-hydroxymethyl-5-ethyl-1,3-dioxane is readily prepared by the acid-catalyzed condensation reaction of acrolein and trimethylolpropane. The alkenyl substituent is readily converted to corresponding dihaloalkyl radicals by the addition thereto of molecular halogen such as chlorine or bromine.

Also included within the scope of suitable hydroxyalkyl-mono-1,3-dioxolanes and -1,3-dioxanes are compounds in which a carbon atom of the respective 1,3-dioxolanyl and 1,3-dioxanyl rings is linked to the hydroxyalkyl group through an oxy-substituted cyclic monoether as shown by the following general formula B'-1-c:

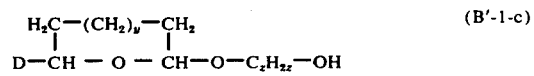

wherein D has the aforesaid significance, $y$ has a value of from 0 to 2 and $z$ is an integer of from 2 to 12, the sum $y+z$ being no greater than 12. The preparation of these compounds is discussed hereinbelow in connection with the following class of monomers.

2. Hydroxy-bis-(1,3-dioxolanyl or -1,3-dioxanyl)alkanes, that is, compounds having the general Formula B' above wherein $b$ is zero, $d$ is one, and $R_1$ is the bivalent hydroxyalkylene group, $-C_mH_{2m-1}(OH)-$, wherein OH may be a secondary or tertiary hydroxyl group. Such compounds have the general formula:

$$D-C_mH_{2m-1}(OH)-D \qquad B'-2$$

wherein $m$ has the aforesaid significance and the linking chain is in association with the 2—, 4— or 5—positions of the respective cyclic nuclei, D.

A preferred group of such compounds for use in this invention are the following:

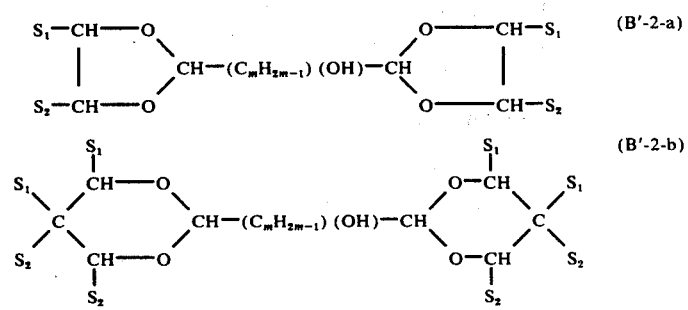

wherein $m$ usually has a value of from 1 to 10, and $S_1$ and $S_2$ may be the same or different and are as above-defined. Of these, the particularly preferred monomers are the compounds wherein $S_1$ and $S_2$ are hydrogen or an alkyl group having from 1 to 4 carbon atoms.

Typical examples of this class of monomers are the hydroxy-1,4-bis-(1,3-dioxolan-2-yl)-butanes; hydroxy-1,4-bis-(4'-alkyl-1,3-dioxolan-2'-yl)-butanes; hydroxy-1,2-bis-(1,3-dioxolan-2-yl)-propane; and hydroxy-1,4-bis-(1,3-dioxan-2-yl)-butanes.

The dioxolanes of this class of monomers comprise the reaction products formed by the condensation of a diol and an aldehyde in a relative proportion of at least two moles of the diol per mole of aldehyde. For example, reaction of ethylene glycol, 1,2-propanediol, 2,3-butanediol, with aldehydes such as 2,3-dihydrofurfural, acrolein dimer, and 2,3,4,5-tetrahydro-2-formyloxepin, provides dioxolanes having general formula B'-2-a when m is three, four and five, respectively. The dioxanes of this class of monomers comprise the reaction products of a diol such as 1,3-propanediol, 2,4-pentanediol and one of the aforesaid aldehydes. In addition to compounds having the structure shown by Formula B'-2 above, the reaction of a diol and the aforesaid mono-unsaturated, formyl-substituted cyclic mono-ethers may also lead to isomeric compounds having the structure represented by formula B'-1-c above. Thus, reaction of the diol and cyclic mono-ether via opening of the mono-ether ring provides compounds having the structure represented by formulas B'-1-a and B'-1-b above, whereas reaction of a mole of diol by addition to the double bond of the mono-ether provides compounds encompassed by Formula B'-1-c. It is to be understood that the reaction product may also be a mixture of such isomeric hydroxyalkyl compounds and that both isomers are suitable monomers for use in the present invention.

3. and 4. Bis-(1,3-dioxolanyl or 1,3-dioxanyl alkyl) carboxylates and Bis-[bis-(1,3-dioxolanyl or 1,3-dioxanyl)alkyl] carboxylates, that is, compounds in which $b$ and $d$ of general Formula B' are both one, $R_1$ and $R_2$ are both either the $-C_mH_{2m}-$ group or the $-C_mH_{2m-1}D-$ group, respectively, and Q' is the dicarboxylate radical, $-OC(O)-R°-C(O)(O)-$. Thus, the bis-(1,3-dioxolanyl alkyl) carboxylates and the bis-(1,3-dioxanyl alkyl) carboxylates have two cyclic acetal nuclei per molecule and the structure:

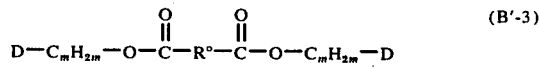
(B'-3)

whereas the bis-[bis-(1,3-dioxolanyl)alkyl] carboxylates and the bis-[bis-(1,3-dioxanyl)alkyl] carboxylates have four cyclic acetal nuclei per molecule and the formula:

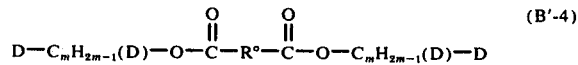
(B'-4)

In each of formulas B'-3 and B'-4, m preferably has a value of from 1 to 10, and R° is the nucleus of a dicarboxylic acid and is as described hereinabove with reference to the $-R'-$ group of the linking chain of the bis-(3,4-dihydro-2H-pyran-2-methyl)carboxylates, referred to herein as Compounds A-5.

The cyclic acetal dicarboxylates having from two to four 1,3-dioxolanyl or 1,3-dioxanyl rings are prepared by the condensation of at least two moles of the aforesaid hydroxyl-containing cyclic acetals designated as Compounds B'-1 and B'-2, per mole of dibasic acid as shown by the following equations.

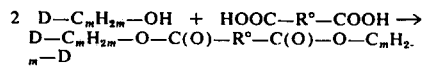

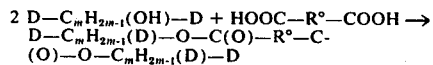

wherein D, m and R° are as above-defined. The preferred carboxylates for use in the present invention are the reaction products of the hydroxyl-containing cyclic acetals designated as Compounds B'-1-a, B'-1-b, B'-1-c, B'-2-a and B'-2-b above, and a dibasic acid such as succinic acid, adipic acid, maleic acid, phthalic acids, chloromaleic acid, tetrabromo- and tetrachlorophthalic acids and chlorendic acid. Typical examples of this group of monomers are: bis-[(2,2-dimethyl-1,3-dioxolan-4-yl)methyl] isophthalate or tetrachlorophthalate; bis-[(2-vinyl-1,3-dioxolan-4-yl)delta-butyl]isophthalate or chlorendate; bis[(2-vinyl-5-methyl-1,3-dioxan-5-yl)methyl]tetrabromophthalate; and bis-[1,4-bis(1,3-dioxolan-2-yl)butyl]-adipate, -chloromaleate and -isophthalate.

5. and 6. Poly-[(1,3-dioxolanyl or 1,3-dioxanyl)alkyl]carbamates and Poly-[bis-(1,3-dioxolanyl or 1,3-dioxanyl)alkyl]carbamates, that is, compounds in which $b$ and $d$ of general Formula B' are both one, $R_1$ and $R_2$ are both either the $-C_mH_{2m}-$ group or the $-C_mH_{2m-1}(D)-$ group, respectively, and Q' is the polycarbamate radical, $-OC(O)-NH-R^{\infty}[-NH-C(O)O-]_{i-1}$ wherein $-R^{\infty}-$ is the nucleus of an organic polyisocyanate having $i$ number of isocyanato groups. These novel compounds comprise the reaction products formed by reacting an organic polyisocyanate having the formula, $R^{\infty}(NCO)_i$, wherein $i$ is an integer having a value of at least two, with at least $i$ number of moles of one of the aforesaid hydroxyl-containing cyclic acetals designated as Compounds B'-1 and B'-2 as shown by the following equations:

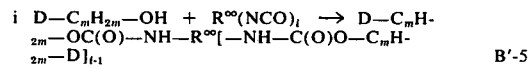
B'-5

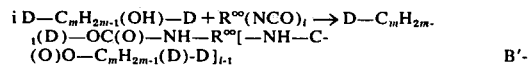
B'-

Of these novel carbamates, the preferred monomers for use in the present invention are the reaction products of the hydroxyalkyl cyclic acetals designated hereinabove as Compounds B'-1-a and B'-1-b, or the hydroxy-bis-(cyclic acetal)alkanes designated hereinabove as Compounds B'-2-a and B'-2-b, with an organic polyisocyanate, $R^{\infty}(NCO)_i$, wherein $i$ has an average value of at least two and $R^{\infty}$ is an aliphatic, cycloaliphatic or aromatic radical which can be an unsubstituted hydrocarbyl group or a hydrocarbyl group substituted for example, with halogen or alkoxy. For example, $R^{\infty}$ can be an alkylene, cycloalkylene, arylene, alkyl-substituted cycloalkylene, alkarylene, aralkylene and halogenated derivatives thereof. Typical examples of suitable polyisocyanates for use in preparing the carbamate-containing cyclic acetal monomers of this invention are: 1,6-hexamethylene diisocyanate, 1,4-tetramethylene diisocyanate, 1-methyl-2,4-diisocyanatocyclohexane, bis(4-isocyanatophenyl)methane, phenylene diisocyanates such as 4-methoxy-1,3-phenylenediisocyanate, 4-chloro-1,3-phenylenediisocyanate, 4-bromo-1,3-phenylenediisocyanate, 5,6-dimethyl-1,3-phenylenediisocyanate, 2,4- and 2,6-tolylene diisocyanates, crude tolylene diisocyanate, 6-isopropyl-1,3-phenylene diisocyanate, durylene diisocyanate, triphenylmethane-4,4',4''-triisocyanate, and many other organic polyisocyanates that are known in the art such as those disclosed in the aforesaid article by Siefkin.

Also included as useful in the preparation of the polycarbamate cyclic acetals employed in this invention are the polyisocyanates of the anilineformaldehyde polyaromatic type which are produced by phosgenation of the polyamine obtained by acid-catalyzed condensation of aniline with formaldehyde. Polyphenylmethylene polyisocyanates of this type are available commercially under such trade names as PAPI, AFPI, Mondur MR, Isonate 390P, NCO-120 and NCO-20. These products are low viscosity (50–500 centipoises at 25° C.) liquids having average isocyanato functionalities in the range of about 2.25 to about 3.2 or higher, depending upon the specific aniline-to-formaldehyde molar ratio used in the polyamine preparation. Other useful polyisocyanates are combinations of diisocyanates with polymeric isocyanates containing more than two isocyanate groups per molecule. Illustrative of such combinations are: a mixture of 2,4-tolylene diisocyanate, 2,6-tolylene diisocyanate and the aforesaid polyphenylmethylene polyisocyanates; and a mixture of isomeric tolylene diisocyanates with polymeric tolylene diisocyanates obtained as residues from the manufacture of the diisocyanates.

Typical examples of the cyclic acetal carbamates are: the reaction product of 2-vinyl-4-(4-hydroxybutyl)-1,3-dioxolane and 2,4- (or 2,6)-tolylene diisocyanate; the reaction product of 2,2-dimethyl-4-hydroxymethyl-1,3-dioxolane and the aforesaid polyphenylmethylene polyisocyanate having an average isocyanato functionality of about 2.7; the reaction product of 2-(1,2-dichloroethyl)-4-hydroxybutyl-1,3-dioxolane and 2,4- (or 2,6-)tolylene diisocyanate; and the reaction product of 2-vinyl-5-methyl-5-hydroxymethyl-1,3-dioxane and 2,4- (or 2,6-) tolylene diisocyanate.

Also included within this class of cyclic monomers for use in the present invention are the reaction products of any one of the aforesaid organic polyisocyanates and the hydroxyalkyl-1,3-dioxolanes and hydroxyalkyl-1,3-dioxanes represented above by general formulas B'-1-a and B'-1-b wherein substituent $S_3$ is an alkenyl group to which an alpha,beta-unsaturated carboxylic acid such as acrylic acid has been added. For example, the reaction of 2-vinyl-4-(hydroxyalkyl)-1,3-dioxolanes and acrylic acid in the presence of p-toluenesulfonic acid provides 2-ethyl acrylate-4-(hydroxyalkyl)-1,3-dioxolanes. Reaction of $i$ number of moles of the latter compound per mole of one of the aforesaid organic polyisocyanates, $R^\infty(NCO)_i$, provides the corresponding bis[(2-ethylacrylate-1,3-dioxolan-4-yl)alkyl]-carbamates.

Also included within the scope of the cyclic acetal monomers are the reaction products of one of the aforesaid organic polyisocyanates and the cyclic acetals having general formula B'-1-c above, as shown by the following equation:

wherein D, $i$, $R^\infty$, $y$ and $z$ have the aforesaid significance.

7. Bis-(1,3-dioxolanyl or 1,3-dioxanyl)-alkanes, that is, compounds of the general Formula B' above wherein $d$ is one, $b$ is zero, and $R_1$ is the divalent alkylene group, $-C_mH_{2m}-$. Such compounds have the following general formula:

$$D-C_mH_{2m}-D \qquad \qquad B'\text{-}7$$

wherein the alkylene group is bonded to either the 2—, 4— or 5— position of the 1,3-dioxolanyl or 1,3-dioxanyl cyclic nucleus (D). Preferably, $m$ has a value of from 1 to 10, and the carbon atoms of D are substituted with $S_1$ and $S_2$ radicals as shown for Compounds B'-2-a and B'-2-b above. Such compounds are prepared by the acid-catalyzed condensation reaction of a diol and dialdehyde, and are typically illustrated by: bis-(1,3-dioxolan-2-yl or 1,3-dioxan-2-yl)propane; bis-(4-alkyl-1,3-dioxolan-2-yl)butanes; and bis-(5-alkenyl-1,3-dioxan-2-yl)propanes.

8. Spiro compounds comprising from one to two 1,3-dioxolanyl or 1,3-dioxanyl rings, and correspondingly from one to zero hydrocarbon cycloaliphatic nuclei, that is, compounds having the general Formula B above wherein $f$ is one (and thus $e$ is zero). This class of monomers have the formula:

$$D\text{-}D' \qquad \qquad B'\text{-}8$$

wherein D and D' share a common carbon atom and D' may or may not be the same cyclic nucleus as D. Typical examples of compounds in which D' is the same as D are the 3,9-dialkenylspirobi(meta-dioxanes) having the formula:

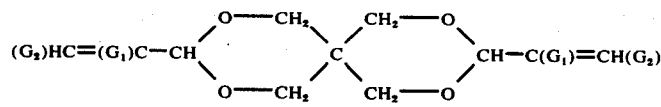

(B'-8-a)

wherein $G_1$ is hydrogen, methyl or chlorine, and $G_2$ is hydrogen or methyl. Such compounds are prepared as described in U.S. Pat. No. 3,110,703, granted Nov. 12, 1963, and any of the unsaturated spirobi(meta-dioxanes) described therein are suitable monomers for use in the present invention. Specific examples of suitable spirobi(meta-dioxanes) for use in the present invention are: 3,9-divinylspirobi(meta-dioxane), 3,9-diisopropenylspirobi(meta-dioxane) and 3,9-di-(1-chlorovinyl)spirobi(meta-dioxane).

Examples of compounds in which D' is different from D are the norbornenyl-containing dioxanes in which a carbon atom of the D nucleus is common to a bicyclo[2.2.1]-5-heptenylene nucleus,

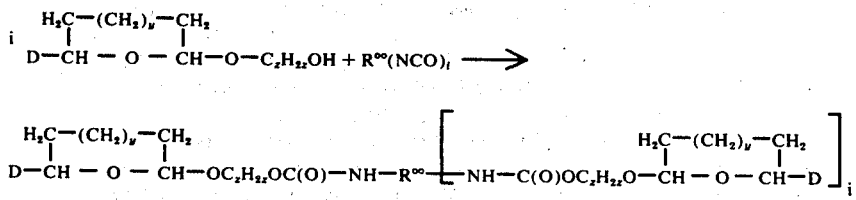

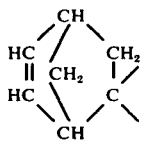

This type of monomer is obtained by the reaction of bicyclo[2.2.1]-5-heptene-2,2-diols and an aldehyde. Such compounds have the structure:

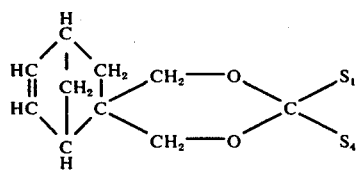

wherein $S_1$ is hydrogen or a lower alkyl group, and $S_4$ is $S_1$ or a bicyclo[2.2.1]-5-heptenyl radical, the nature of $S_1$ and $S_4$ depending upon the type of aldehyde reactant employed in preparing the spiro compound.

THE COPOLYMERIZATION REACTION

In accordance with the process of this invention, the aforesaid di-(dihydropyranyl) compounds and cyclic acetals are copolymerized in a reaction medium comprising a cationic polymerization catalyst under conditions such that either thermoset resins or foamed polymeric products are produced. The relative proportions of monomers employed may vary over a relatively wide range without departing from the scope of this invention. Generally, the mole ratio of di-(dihydropyranyl) monomer to the cyclic acetal monomer ranges from about 0.2 : 1 to about 10 : 1. It is to be understood that included within the scope of the present invention is the copolymerization of one or more of the di-(dihydropyranyl) compounds with more than one of either the above-described 1,3-dioxolanes or 1,3-dioxanes, or the di-(dihydropyranyl) monomer may be copolymerized with a combination of the dioxolane and dioxane monomers.

In accordance with the teachings of this invention, the polymerizaton catalyst is cationic by which latter term is meant any strongly acid catalyst including strong proton-donating acids and Lewis acids. Typical examples of suitable cationic polymerization catalysts for use in the present invention are p-toluenesulfonic acid, phosphoric acid, perchloric acid, trifluoroacetic acid, trichloroacetic acid, fluoboric acid, fluosilicic acid, hydrogen fluoride, hexafluorophosphoric acid, silicotungstic acid, boron trifluoride, trimethoxy boroxine, ferric chloride, stannic chloride, phosphorus pentachloride, antimony pentafluoride, zinc chloride and aluminum chloride.

It is to be understood that the catalyst system may comprise a combination of any of the aforesaid polymerization catalysts and that the catalyst may be used in the form of a coordination complex with an organic compound wherein the donor atom is oxygen, sulfur, or fluorine. Typical examples of such complexing agents are ethers, alcohols including mono-ols and polyols, carboxylic acids, alkyl sulfides, mercaptans and hydrogen fluoride. Such complexes may be added to the polymerization reaction system in a preformed state or they may be formed in the reaction system. The catalyst may also be used in the form of a solution in non complexing solvents such as the normally liquid hydrocarbons (e.g., heptane, toluene, xylene and the like). A preferred class of catalysts are those comprising boron such as, in particular, boron trifluoride which is usually added to the polymerization reaction system as a solution in a complexing solvent such as the saturated aliphatic or aromatically unsaturated ethers and glycols including glycols which also contain an ether linkage. Typical examples of such solvents are diethyl ether, dibutyl ether, ethyl alcohol, benzyl alcohol, propylene glycol, diethylene glycol, and dipropylene glycol. Solutions of boron trifluoride etherates are especially suitable.

The catalyst is present in the polymerization reaction system in an amount which is, of course, at least sufficient to initiate the polymerization reaction. Generally, the mole ratio of catalyst to total monomers varies from about 0.0001 : 1 to about 0.5 : 1, and is preferably at least 0.001 : 1. This ratio expresses the total concentration of active cationic initiator (e.g., boron trifluoride) and, when present, the complexing agent (e.g., ether as in the boron trifluoride etherates).

The polymerization reactions described herein are exothermic and occur over a relatively wide range of temperatures such as from about 0° C. up to the peak exotherm of any particular reaction mixture. Usually, the copolymerizaton reactions commence at temperatures from about 15° C. to about 25° C. and peak exotherms up to about 200° C. may be reached relatively rapidly. The temperature at which a particular reaction begins and the exothermicity thereof depends on a number of factors such as the particular mixture of monomers, the catalyst, the presence or absence of complexing agents, solvents or diluents and the like. As desired, initial reaction temperatures may be controlled in any suitable manner such as by cooling, adding the catalyst at a controlled rate or effecting the reaction in dilute phase. When the initial liberation of heat has subsided, the reaction mixture may be heated from an external source to maximize the extent of copolymerization.

In accordance with a preferred embodiment of the process described herein, the polymerization is carried out in the presence of a phenolic compound, that is, a compound in which at least one hydrogen atom of an aromatic nucleus has been replaced by a hydroxyl group. Typical examples of suitable phenolic compounds which may be used as an ingredient of the polymerization reaction mixture are: the mono- and polyhydric unsubstituted phenols such as phenol, naphthol, catechol, resorcinol, hydroquinone, pyrogallol, phloroglucinol; alkyl-substituted phenolic compounds in which the alkyl group contains from 1 to 12 carbon atoms and usually not more than 6 carbon atoms such as the cresols, xylenols, ethylphenols, 2,4,5-trimethylphenol, durenol, thymol, 2,4,6-tritert-butylphenol, 4-tert-amylphenol, and o-cyclohexylphenol; aryl- and halogen-substituted phenols such as m-phenylphenol, 4,4'-dihydroxybiphenyl, m-chlorophenol, 2,4,5-trichlorophenol, 2,4,6-tribromophenol; hydroxyphenyl-substituted alkanes such as bis(4-hydroxyphenyl)methane, 2,2-bis(4-hydroxyphenyl)propane (Bisphenol A), 2,2-bis(4-hydroxyphenyl)butane and 2,2-bis(4-hydroxy-3-methylphenyl)propane; low molecular weight phenol-terminated polycarbonates; condensation products of phenols with aldehydes and ketones such as resoles and novolaks; and any combination of such phenolic compounds.

When used, the phenolic compound constitutes from about 2 to about 30, and preferably from about 5 to about 20, weight percent of the combined total weight of the di-(dihydropyranyl) and cyclic acetal monomers.

In accordance with one embodiment of the process of this invention, the polymerization reaction is carried out under the aforesaid conditions to provide copolymers ranging from viscous liquid resins, useful as plasticizers, to tough resinous solids, useful as surface coatings.

In accordance with another embodiment of the process of this invention, the polymerization reaction is carried out under the aforesaid conditions and such that foamed polymeric products are provided. In accordance with this embodiment, the polymerization reaction medium comprises the monomer mixture, one or more of the above-described cationic polymerization catalysts, a blowing agent, usually a foam stabilizer to reduce any tendency of the foam to collapse until the foamed product has developed sufficient gel strength to become self-supporting, and preferably one or more of the aforesaid phenolic compounds.

The blowing agents which can be employed in the process of this invention include liquefied gases which vaporize at or below the temperature of the exothermic polymerization reaction such as saturated or non polymerizable halogenated hydrocarbons, or other inert gases such as nitrogen, carbon dioxide, methane, helium and argon. Halocarbon blowing agents suitable for use in the process of this invention are: trichloromonofluoromethane, dichlorodifluoromethane, dichloromonofluoromethane, dibromodifluoromethane, 1,1-dichloro-1-fluoroethane, 1-chloro-1,1-difluoro-2,2-dichloroethane, dichlorotetrafluoroethane, trichlorotrifluoroethane, 1,1,1-trifluoro-2-fluoro-3,3-difluoro-4,4,4-trifluorobutane, dichlorohexafluorocyclobutane, methylene chloride, chloroform, trichloroethylene, carbon tetrachloride and perchloroethylene.

The foam stabilizer, when used, is usually a siloxane-oxyalkylene block copolymer and may be any of such copolymers described in the prior art. Generally, the block copolymers comprise (1) siloxy units having the formula, $Z_2SiO$, (2) polyether-substituted siloxy units having the formula, $Z°O(C_nH_{2n}O)_xC_mH_{2m}Si(Z)O$, and (3) siloxy units having the formula, $Z_3SiO_{1/2}$, where: Z in each instance is a monovalent hydrocarbon group having from 1 to 12 carbon atoms such as alkyl and aryl groups, in particular methyl; $Z°$ is either Z, Z—C(O) or hydrogen where Z is as aforesaid; $—C_mH_{2m}—$ is a bivalent hydrocarbon radical, usually of 2 to 5 carbon atoms, that links the respective silicon atoms of the polyether-substituted siloxy units to the polyether block, $Z°O(C_nH_{2n}O)_x$, in which n has a value of from 2 to 4 and the average value of x is such that the average molecular weight of the polyether block is from about 200 to about 6000. Illustrative block copolymers for use as foam stabilizers in the foaming reaction of this invention are, for example, the copolymers described in U.S. Pat. Nos. 2,834,748; 2,917,480; 3,505,377; 3,507,815; and in U.S. pat. applications Ser. No. 718,920, filed Apr. 4, 1968, now U.S. Pat. No. 3,563,924, and Ser. No. 109,587, filed Jan. 25, 1971, now abandoned. Such copolymer compositions are incorporated herein by reference to the aforesaid patents.

The relative amounts of the various components used in the foaming formulation are not narrowly critical. The di-(dihydropyranyl) and cyclic acetal monomers, taken together, usually comprise the major per cent by weight of the foam formulation (exclusive of solvents or diluents). The catalyst, blowing agent and foam stabilizer, when used, are each present in a minor amount sufficient to perform their respective functions. The blowing agent usually comprises from about 5 to about 40 weight per cent of the total weight of monomers, the particular amount of blowing agent employed depending primarily on the desired density of the foamed product. The foam stabilizer, when used, is usually present in an amount of from about 0.1 to about 5 weight percent of the total weight of the monomer mixture. The cationic polymerization catalyst and the phenolic compound, when used, are present in the respective concentrations stated above.

If desired, other additional ingredients can be employed in minor amounts and for specific purposes in producing the polymeric products of this invention including the foamed products. For example, one type of additive is an organic flame-retardant which preferably contains phosphorus or halogen or both phosphorus and halogen. Among the suitable flame-retardants which may be incorporated in the polymeric compositions of this invention are: tri(2-chloroethyl)phosphate; 2,2-bis(3',5'-hydroxyphenyl)propane; 2,2-di(-bromomethyl)-1,3-propanediol; chlorendic acid; brominated phthalate ester diols (e.g., from tetrabromophthalic anhydride and propylene oxide); tetrabromobisphenol-A; tetrabromophthalic anhydride; 2,4,6-tribromophenol; bis(2,3-dibromopropyl)phosphoric acid or salts thereof; tris(1-bromo-3-chloroisopropyl)phosphate; tris(2,3-dibromopropyl)phosphate; and other flame-retardants known in the art.

When used, the flame retardant is usually present in an amount between about 2 and about 20 weight per cent of the weight of the monomers to be polymerized. Other additives which may be present during the polymerization process described herein and incorporated into the polymeric products are dyes, fillers, stabilizers, anti-oxidants, plasticizers and the like.

The polymeric foams produced in accordance with this invention are useful as insulation materials. In view of their good thermal insulating and mechanical strength properties, they find particular application in refrigeration equipment, trailor trucks and in the building industry.

EXAMPLES I–XXII

These examples illustrate copolymerization of 3,4-dihydro-2H-pyran-2-methyl(3,4-dihydro-2H-pyran-2-carboxylate) and various monofunctional and difunctional 1,3-dioxolanes and 1,3-dioxanes.

1. MONOMERS EMPLOYED

In these examples, the di-(dihydropyranyl)-monomer employed was 3,4-dihydro-2H-pyran-2-methyl-(3,4-dihydro-2H-pyran-2-carboxylate) having a boiling point of 115°–119° C. at 0.50 mm. mercury pressure and prepared by the self-condensation of 2-formyl-3,4-dihydro-2H-pyran in the presence of aluminum isopropoxide catalyst. This monomer is designated as Monomer $M_1$.

The 1,3-dioxolanes and 1,3-dioxanes employed are identified in Table I below and, for convenience, are deisgnated generally as Monomer $M_2$ and individually as Comonomers A through K. Comonomers A, B, C and K of Table I are known compounds and were used as available commercially from Aldrich Chemical Company (Comonomer A) and Union Carbide Corporation (Comonomers B, C and K). Comonomers D-J of Table I were prepared as described under the following Examples 2(i)-(vii).

2. PREPARATION OF COMONOMERS D-J OF TABLE I i. Comonomer D —
2-(1,2-dichloroethyl)-4-(4-hydroxybutyl)-1,3-dioxolane

Liquid chlorine (228 ml.; 5 moles) was added to a solution of Comonomer B (860 grams; 5 moles), that is, 2-vinyl-4-(4-hydroxybutyl)-1,3-dioxolane, in 3600 ml. of carbon tetrachloride over a period of 4.5 hours while maintaining the temperature at 20°–30° C. by means of intermittent cooling with an ice-bath. When the addition of chlorine was complete, the mixture was stirred at ambient temperature overnight. After removal of solvent by heating the mixture at 51° C. and 1 mm. mercury pressure for one hour, the product was obtained as a colorless viscous material.

ii. Comonomer E — 1,3-bis(1,3-dioxolan-2-yl)propane

A reaction flask containing 1001 grams of a 50 weight per cent aqueous solution of glutaraldehyde (5 moles), ethylene glycol (621 grams; 10 moles), toluene (800 ml.) and p-toluene sulfonic acid (0.56 grams) was heated slowly to refluxing temperatures (90°–125° C.). During a seven hour period, water (665 grams; 98 per cent recovery) was collected by means of a Dean-Stark trap. The reaction mixture was then distilled through a 10-inch Vigreaux column thereby providing 803 grams (85 weight per cent yield) of colorless product having a boiling point of 133°–137° C. at 1.66 mm. pressure. Upon analysis, the product was found to contain 57.16 and 8.72 weight per cent carbon and hydrogen, respectively; the corresponding values calculated for the empirical formula, $C_9H_{16}O_4$, of Comonomer E are 57.43 and 8.57.

iii. Comonomer F —
Bis[(2,2-dimethyl-1,3-dioxolan-4-yl)methyl]isophthalate

Into a five liter capacity, four-necked flask equipped with a thermometer, stirrer, nitrogen inlet and a 10-inch helix packed column were placed 1322 grams (10 moles) of 2,2-dimethyl-4-hydroxymethyl-1,3-dioxolane (Comonomer A herein), 971 grams (5 moles) of dimethyl isophthalate, 1700 grams of dry toluene and 7 grams of sodium methoxide. The reaction mixture was heated to reflux. During 5 hours, a binary mixture (927 grams) of toluene-methanol was collected at a head temperature of 95°–106° C. by maintaining a flask temperature of 137°–145° C. After cooling to 25° C., 500 ml. of dichloromethane was dissolved in the reaction mixture. The resulting mixture was washed with four 1000 ml. portions of 5 per cent aqueous sodium chloride solution. The organic layer was dried over anhydrous magnesium sulfate, filtered, and evaporated to give a crude amber-colored oil. Distillation of the oil afforded 999.5 grams (51 per cent yield) of substantially pure white product having a boiling point of 205°–212° C. (at 0.50–0.60 mm. pressure). Analysis of the product showed carbon and hydrogen contents of 60.74 and 6.83 weight per cent, respectively. The calculated carbon and hydrogen contents (basis, $C_{20}H_{26}O_8$) are 60.91 and 6.59 respectively.

iv. Comonomer G —
Bis[(2-vinyl-1,3-dioxolan-4-yl)-4-butyl]isophthalate

A five liter, four-necked flask equipped with a thermometer, stirrer, nitrogen inlet and a 10-inch helix packed column containing a solution of 1720 grams (10 moles) of 2-vinyl-4-(4-hydroxybutyl)-1,3-dioxolane (Comonomer B herein), 791 grams (5 moles) of dimethyl isophthalate, 1700 grams of dry toluene and 7 grams of sodium methoxide was heated to reflux. During 5 hours, 700 grams of a toluene-methanol binary mixture was collected at a temperature of 63° to 105° C. The remaining toluene was distilled from the reaction mixture at atmospheric pressure and the residue was washed four times with 1000 ml. portions of a 5 per cent sodium chloride solution, adding 500 grams of dichloro-methane to break the emulsion. After drying the non aqueous layer over magnesium sulfate and removing the solvent under reduced pressure, the product was found to be an oil which was non distillable at temperatures up to 235° C. at 0.7 mm. mercury pressure.

v. Comonomer H —
2,4-Bis[(2,2-dimethyl-1,3-dioxolan-4-yl)methyl]-N,N'-tolyl carbamate To a one-liter, four-necked flask equipped with a stirrer, thermometer, nitrogen inlet and dropping funnel was placed 396.5 grams (3 moles) of 2,2-dimethyl-4-hydroxymethyl-1,3-dioxolane (Comonomer A herein). Toluene diisocyanate (261 grams; 1.5 mole) was added dropwise during 10 minutes while maintaining the temperature at 25° C. There was no immediate exotherm but on continued stirring after the addition was complete, the temperature of the reaction mixture rose to 35° C. The mixture was then stirred for 6 hours at 30° C. The product was isolated as a residue and purified by heating at 150° C. and 0.20 mm. pressure in a falling film still. The purified product had a viscosity of 392,000 centipoises at 25° C.

vi. Comonomer I —
2,4-Bis[2-vinyl-1,3-dioxolan-4-yl)-4-butyl]-N,N'-tolyl carbamate.

Toluene diisocyanate (870 grams; 5 moles) was added to 1720 grams (10 moles) of 2-vinyl-4-(4-hydroxybutyl)-1,3-dioxolane (Comonomer B herein) with stirring, under an atmosphere of nitrogen, during 3.24 hours. The reaction was slightly exothermic and the temperature was adjusted between 25°–45° C. during the addition. The carbamate was isolated as a residue product. Purification was effected by heating at 150° C. and 0.20 mm. pressure in a falling film still. The purified product had a viscosity of 260,000 centipoises at 25° C.

vii. Comonomer J —
2,4-Bis[(2-vinyl-5-methyl-1,3-dioxan-5-yl)methyl]-N,N'-tolyl carbamate Toluene diisocyanate (696 grams; 4 moles) was added dropwise during 4 hours while maintaining the temperature at 20°–25° C. to 1264 grams (8 moles) of 2-vinyl-5-hydroxymethyl-5-methyl-1,3-dioxane (Comonomer C herein). The reaction was exothermic and an ice bath was employed for cooling purposes. When the addition was complete the mixture was stirred overnight at 25° C. The product crystallized to a glassy solid and was used without further purification.

3. THE COPOLYMERIZATION REACTIONS

In each of the copolymerization reactions of Examples I-XXII, the catalyst was rapidly and thoroughly mixed into an undiluted solution of the di(dihydropyranyl)monomer ($M_1$) and the respective, aforesaid cyclic acetal comonomers, designated as Comonomers A-K, at about 25° C. during a period of 20 seconds. The catalyst employed was a 10 per cent solution of boron trifluoride etherate, $BF_3.O(C_2H_5)_2$ in diethylene glycol. The respective polymerization mixtures were then poured into a three-inch diameter aluminum mold. The polymerization induction time was taken as the first noticeable deflection of the pyrometer needle and the peak exotherm (i.e., the temperature-time profile) was recorded. The structure of Comonomers A-K, the relative molar proportions of monomers and catalyst used and the results obtained are indicated in the following Table I.

| Example No. | Cyclic Acetal Monomer ($M_2$) No. | Name and Structure | Monomer Concentration moles × 10 $M_1$/1/ | $M_2$ | Initiator /2/ Concentration gms./3/ | /I/ mole × 10⁴ | $M_1+M_2$ / I | Polymerization Induction Time, Sec. | Peak Exotherm °C. | Time, Sec. | Description of Product |
|---|---|---|---|---|---|---|---|---|---|---|---|
| I | A | 2,2-dimethyl-4-hydroxymethyl-1,3-dioxolane | 1.11 | 1.88 | 0.5 | 3.53 | 848 | 50 | 100 | 180 | Viscous liquid resin |
| II | A |  | 1.11 | 1.88 | 1.0 | 7.05 | 425 | 45 | 96 | 155 | " |
| III | B | 2-vinyl-4-(4-hydroxybutyl)-1,3-dioxolane | 1.11 | 1.45 | 0.5 | 3.53 | 725 | 160 | 147 | 19.5/4/ | Hard tough plaque (tacky surface) |
| IV | B |  | 1.11 | 1.45 | 1.0 | 7.05 | 363 | 80 | 159 | 400 | " |
| V | C | 2-vinyl-5-hydroxymethyl-5-methyl-1,3-dioxane | 1.11 | 1.58 | 0.5 | 3.53 | 762 | 60 | 139 | 225 | Hard, tough plaque |
| VI | C |  | 1.11 | 1.58 | 1.0 | 7.05 | 382 | 30 | 153 | 150 | " |
| VII | D | 2(1,2-dichloroethyl)-4-(4-hydroxybutyl)1,3-dioxolane | 1.11 | 1.32 | 0.5 | 3.53 | 688 | 68 | 96 | 260 | Hard Plaque (slightly tacky surface) |
| VIII | D |  | 1.11 | 1.32 | 1.0 | 7.05 | 354 | 35 | 93 | 160 | " |
| IX | E | 1,3-bis(1,3-dioxolan-2-yl)-propane | 1.11 | 1.33 | 0.5 | 3.53 | 691 | 90 | 110 | 420 | Hard, tough plaque (slight shrinkage) |
| X | E |  | 1.11 | 1.33 | 1.0 | 7.05 | 346 | 45 | 140 | 240 | Hard, tough plaque (high gloss) |
| XI | F | bis[4-(2,2-dimethyl-1,3-dioxolan-4-yl)methyl]isophthalate | 1.11 | 0.630 | 0.5 | 3.53 | 493 | 75 | 92 | 180 | Hard, tough, clear plaque |
| XII | F |  | 1.11 | 0.630 | 1.0 | 7.05 | 247 | 40 | 97 | 180 | Hard, tough, brown plaque |
| XIII | G | bis[2-vinyl-1,3-dioxolan-4-yl)-4-butyl]isophthalate | 0.223 | 0.016 | 0.35 | 2.47 | 1.33 | 57 | 95 | 90 | Hard, tough clear amber plaque |

TABLE I-continued

| Example No. | Cyclic Acetal Monomer (M₂) No. | Name and Structure | Monomer Concentration moles × 10 $M_1$/1/ | $M_2$ | Initiator (I)/2/ Concentration gms./3/ | mole × 10⁴ | $M_1+M_2$ / I | Polymerization Induction Time,Sec. | Peak Exotherm °C. | Time,Sec. | Description of Product |
|---|---|---|---|---|---|---|---|---|---|---|---|
| XIV | G | [structure] | 0.134 | 0.148 | 0.35 | 2.47 | 114 | 64 | 120 | 110 | " |
| XV | H | 2,4-bis[(2,2-dimethyl-1,3-dioxolan-4-yl)methyl]-N,N'-tolyl carbamate | 1.11 | 0.568 | 0.5 | 3.53 | 475 | 50 | 79 | 250 | Hard, brittle, clear plaque |
| XVI | H | | 1.11 | 0.568 | 1.0 | 7.05 | 238 | 30 | 90 | 150 | Hard, brittle, amber plaque |
| XVII | I | 2,4-bis[(2-vinyl-1,3-dioxolan-4-yl)-4-butyl]-N,N'-tolyl carbamate | 1.11 | 0.481 | 0.5 | 3.53 | 451 | 40 | 47 | 28/4/ | Soft, rubbery (polymerization incomplete)/5/ |
| XVIII | I | | 1.11 | 0.481 | 1.0 | 7.05 | 226 | 30 | 152 | 160 | Hard, tough plaque (high gloss) |
| XIX | J | 2,4-bis[(2-vinyl-5-methyl-1,3-dioxan-5-yl)methyl]-N,N'-tolyl carbamate | 1.11 | 0.510 | 0.5 | 3.53 | 459 | 30 | 93 | 160 | Hard, tough plaque |
| XX | J | | 1.11 | 0.510 | 1.0 | 7.05 | 230 | 32 | 109 | 100 | Hard, tough, light brown plaque |
| XXI | K | 3,9-divinylspirobi(m-dioxane) | 1.03 | 2.21 | 0.70 | 4.94 | 656 | 50 | 143 | 210 | Hard, tough, clear tan plaque (high gloss) |
| XXII | K | | 0.625 | 2.64 | 0.70 | 4.94 | 624 | 69 | 92 | 220 | Hard (tacky) plaque/6/ |

/1/Monomer M₁ was 3,4-dihydro-2H-pyran-2-methyl(3,4-dihydro-2H-pyran-2-carboxylate).
/2/The initiator, designated I, was BF₃.O(C₂H₅)₂ employed as a 10 weight per cent solution in diethylene glycol.
/3/Weight of solution referred to in footnote 2, containing the indicated number of moles of BF₃ . O(C₂H₅)₂.
/4/Minutes.
/5/At the combination of relatively low comonomer and catalyst concentrations employed in this example, the exothermicity of the reaction was low indicating a more severe condition is required to complete the reaction such as longer reaction time or higher catalyst concentration (as used in Example XVIII).
/6/After reaction mixture was allowed to stand 2 days to provide more complete copolymerization.

The results of Table I show that, with the exception of Comonomer A employed in Examples I and II, copolymerization of the di-(dihydropyranyl) monomer and cyclic acetal Comonomers B–K provided hard, and in most instances, tough plaques. The term "tough" as used in Table I indicates that the respective surfaces of the copolymer products did not crack or break when scraped with a knife edge and that such products are useful as ingredients of coating compositions (e.g., paints) which require satisfactory abrasion resistance. The viscous resinous products produced in accordance with Examples I and II in which Comonomer A was used, are useful as plasticizers. The brittle nature of the products provided in Examples XV and XVI is believed attributable to the relatively low concentration of Comonomer H which was used, and may be improved by carrying out the copolymerization at higher concentrations of this particular comonomer such as, for example, about 0.7 mole per mole of the di-(hydropyranyl) compound.

EXAMPLES XXIII – XXVI

In these examples, the cyclic acetals employed are designated Comonomer L (the product obtained by reacting acrolein dimer with ethylene glycol) and Comonomer N (the product obtained by reaction Comonomer L and toluene diisocyanate).

1. Preparation of Comonomer L —
1-Hydroxy-1,4-bis(1,3-dioxolan-2-yl)butane and/or
2-(2-hydroxyethoxy)-6-(1,3-dioxolan-2-yl)pyran.

Freshly distilled acrolein dimer (560.6 grams; 5.0 moles) was added dropwise to a solution of 620.1 grams (10.0 moles) of ethylene glycol and 13 drops of concentrated hydrochloric acid in 1500 ml of benzene at 80° C. during 2 hours and 15 minutes. Water which formed was collected by means of a Dean-Stark trap. During the addition of acrolein dimer, the reaction maintained itself at 80° C. and 21.0 grams of water was collected. When the addition of the dimer was complete, the mixture was heated for 2.5 hours during which time an additional 65.0 grams of water was collected. The total yield of water was 86.0 grams or 96 weight per cent. The reaction mixture was concentrated by distillation of 968 grams of the benzene at atmospheric pressure, followed by the addition of calcium oxide (2.0 grams). After standing for several days, the remainder of the solvent was stripped at 60° C. and 0.6 mm. mercury pressure. Distillation of the remaining material provided 393.4 grams of colorless product having a boiling point of 125°–129° C. at 0.47–0.48 mm. pressure. Analysis of the reaction product by infrared absorption revealed bands at 2.89 microns attributable to OH and at 3.45, 8.64, 9.15 and 9.40 microns attributable to ether (O—CH$_2$, C—O, C—O—C) linkages; no peaks due to C=C absorption were revealed. This acid-catalyzed condensation reaction of acrolein dimer and ethylene glycol may proceed in accordance with the following equation (1) to provide Isomer L-1 or Isomer L-2 or a mixture thereof.

Equation 1:

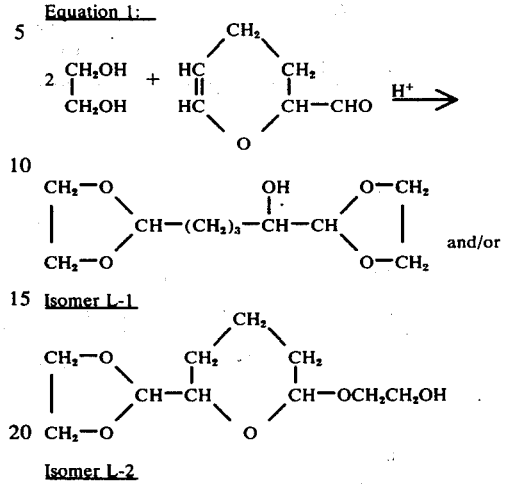

Isomer L-1

Isomer L-2

The empirical formula for each of these isomeric compounds is $C_{10}H_{18}O_5$, representing calculated weight percentages of carbon, hydrogen and oxygen of 55.03; 8.31 and 36.66, respectively. Upon analysis of the aforesaid colorless product, it was found to contain 55.14 and 8.42 weight per cent carbon and hydrogen, respectively (another analysis showed 55.17 and 8.16, respectively). In an attempt to identify Monomer L as having the structure of Isomer L-1 or Isomer L-2 or a mixture thereof, the NMR spectrum of the reaction product was taken. This analysis exhibited signals centered at delta 4.78 (two protons, a triplet, attributed to protons at $C_2$ of the dioxolane rings); 3.77 (ten protons, a multiplet due to ethylene glycol, methine and hydroxyl protons) and 1.67 ppm (six methylene protons). This spectrum fits the structures of both isomers of Comonomer L but cannot differentiate between them.

2. Preparation of Comonomer N —
2,4-Bis{1-[1,4-bis(1,3-dioxolan-2-yl)butyl]}-N,N'-tolyl carbamate and/or
2,4-Bis{beta-[2-ethoxy-6-(1,3-dioxolan-2-yl)pyranyl]}-N,N'tolyl carbamate To Comonomer L above (60 grams; 0.275 mole) there was added 2,4-toluene diisocyanate (23.95 grams; 0.1375 mole) during 30 minutes while maintaining the reaction temperature at 25°–30° C. The reaction tended to be exothermic and cooling of the reaction flask was necessary throughout the addition. The reaction mixture was stirred overnight at ambient conditions and, after standing three days, the viscous, colorless product crystallized to a glassy solid. Depending upon whether Comonomer L has the structure of Isomer L-1 or Isomer L-2, Comonomer N has the structure of Isomer N-1 or Isomer N-2, respectively, or is a mixture thereof, as shown by the following equations (2) and (3):

EQUATION 2:

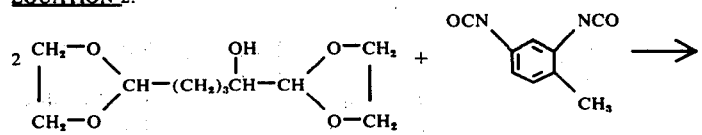

-continued

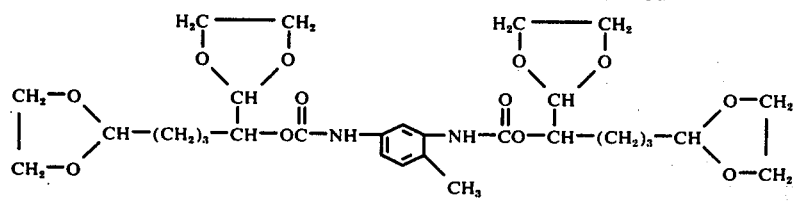

Isomer N-1

EQUATION 3:

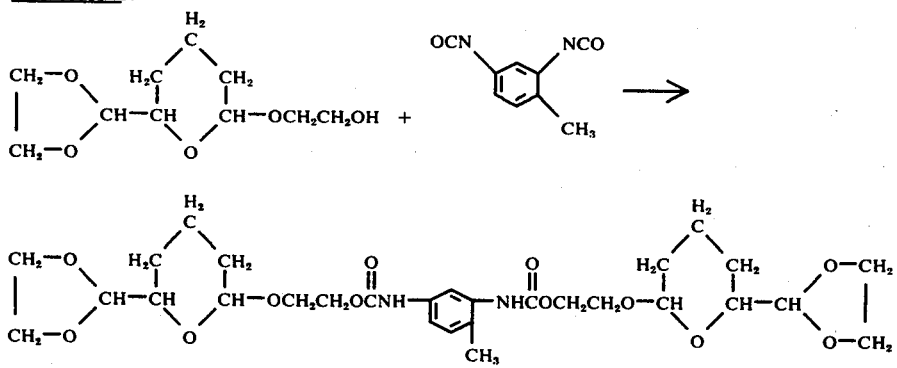

Isomer N-2

3. Copolymerization of Comonomers L and N

Each of the above-described cyclic acetals, designated as Comonomers L and N, were copolymerized at room temperature (about 25° C.) with 3,4-dihydro-2H-pyran-2-methyl(3,4-dihydro-2H-pyran-2-carboxylate) in accordance with the procedure described above with respect to Examples I–XXII using 25 grams of each monomer. The reaction conditions employed and the results obtained are given in the following Table II.

the general procedure of Examples III–XXVI was such to provide solid polymeric products in the form of a molded plaque, the reactions may also be be carried out by spreading or casting the respective reaction mixtures on glass with a doctor knife in accordance with conventional procedure, to form films having essentially the same physical characteristics as the molded plaques.

EXAMPLE XXVII

TABLE II

| Example No. | Cyclic Acetal Comonomer, $M_2$ | Concentration of Monomers mole × 10 $M_1/1/$ | $M_2$ | Initiator (I)/2/ Concentration gms/3/ | mole × 10[4] | $\dfrac{M_1 + M_2}{I}$ | Polymerization Induction Time, Seconds | Polymerization Peak Exotherm Temp., °C. | Time,Sec | Description of Product |
|---|---|---|---|---|---|---|---|---|---|---|
| XXIII | L | 1.11 | 1.15 | 0.5 | 3.53 | 640 | 180 | 88 | 15.5/4/ | Hard plaque (tacky surface) |
| XXIV | L | 1.11 | 1.15 | 1.0 | 7.05 | 321 | 90 | 91 | 330 | Hard plaque (tacky surface) |
| XXV | N | 1.11 | 0.410 | 0.5 | 3.53 | 430 | 40 | 103 | 260 | hard, tough, brown plaque |
| XXVI | N | 1.11 | 0.410 | 1.0 | 7.05 | 216 | 45 | 111 | 270 | hard, tough, brown plaque |

/1/Monomer $M_1$ was 3,4-dihydro-2H-pyran-2-methyl(3,4-dihydro-2H-pyran-2-carboxylate).
/2/The initiator (I) was $BF_3 . O(C_2H_5)_2$ employed as a 10 weight per cent solution in diethylene glycol.
/3/Weight of solution referred to in footnote 2, containing the indicated number of moles of $BF_3 . O(C_2H_5)_2$.
/4/Minutes The results of Table II further demonstrate that the cyclic acetals described herein including those of a relatively complex nature such as Comonomer N, are capable of providing thermosetting resins. Although Preparation and Copolymerization of Comonomer O--
-2,4-Bis[2-ethylacrylate-1,3-dioxolan-4-yl)-4-butyl]-N-N'-tolyl carbamate

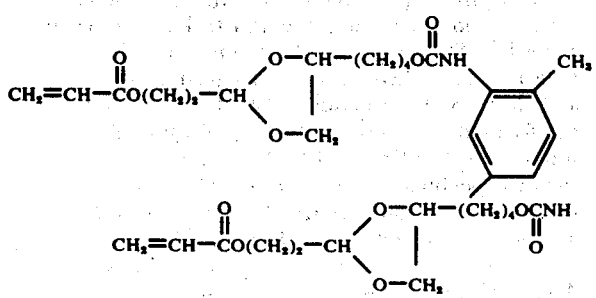

1. Preparation of 2-ethylacrylate-4-(4-hydroxybutyl)-1,3-dioxolane, (1) Preparation of 2-ethylacrylate-4-(4-hydroxybutyl)-

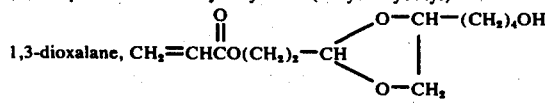

A solution of 172.2 grams (1 mole) of 2-vinyl-4-(4-hydroxybutyl)-1,3-dioxolane (Comonomer B herein), 72.1 grams (1 mole) of acrylic acid and 0.1 gram of p-toluenesulfonic acid in 5 ml. of 1,2-dimethoxyethane was heated for 10 hours at 50°-60° C. After adding water (150 ml) and dichloromethane (200 ml), the non aqueous layer was washed successively with 100 ml. of 5 per cent sodium bicarbonate and two 100-ml. portions of water, and was then dried over magnesium sulfate. Hydroquinone (0.5 gram) stabilizer was added, the magnesium sulfate removed by filtration and the solvent evaporated under reduced pressure. The resulting oil was distilled through a 6-inch Vigreaux column to give 46.2 grams (19 weight per cent yield) of colorless product having a boiling point of 83°-87° C. at 1 mm. pressure. Upon analysis, the product was found to contain 62.28 and 9.12 weight per cent of carbon and hydrogen, respectively. The corresponding calculated values, based on the empirical formula, $C_{12}H_{20}O_5$, are 59.00 and 8.25.

2. Preparation of Comonomer O

Toluene diisocyanate (7.14 grams; 0.041 mole) was added to the above-described addition product (20 grams; 0.082 mole) of 2-vinyl-4-(4-hydroxybutyl)-1,3-dioxolane and acrylic acid, over a period of 30 minutes at 25°-30° C. The reaction was slightly exothermic and there was a slight increase in solution viscosity when the addition was complete. The viscous yellow liquid was employed as the residue product.

3. Copolymerization of Comonomer O

A mixture containing 25 grams of Comonomer O and 25 grams of 3,4-dihydro-2H-pyran-2-methyl(3,4-dihydro-2H-pyran-2-carboxylate) was copolymerized in the presence of 0.5 gram of a 10 weight per cent solution of boron trifluoride complexed with diethyl ether in diethylene glycol, at about 25° C. following the procedure described above with respect to Examples I–XXII. The polymerization induction time was 50 seconds and the polymerization peak exotherm was 115° C. reached in 280 seconds. The copolymer product was a hard, tough, transparent plaque which did not break or crack when scratched with a knife edge indicating good abrasion resistance.

EXAMPLE XXVIII

This example illustrates the preparation and copolymerization of a norbornenyl-substituted spiro compound of 1,3-dioxane

1. Preparation of Comonomer P--

-2-(2-Bicyclo[2.2.1]-5-heptene)-5-(2-spirobicyclo[2.2.1]-5-heptene)-1,3-dioxane

A solution of 190.2 grams (1.56 moles) of bicyclo [2.2.1]-5-heptene-2-carboxaldehyde, 240 grams (1.56 moles) of bicyclo [2.2.1]-5-heptene-2,2-dimethanol, 0.47 gram of p-toluenesulfonic acid and 468 ml. of benzene, was heated under reflux for 4 hours during which time 28 grams (100 per cent yield) of water was collected in a Dean-Stark trap. This acid-catalyzed condensation reaction provides Comonomer P as shown by the following equation (4).

Equation 4:

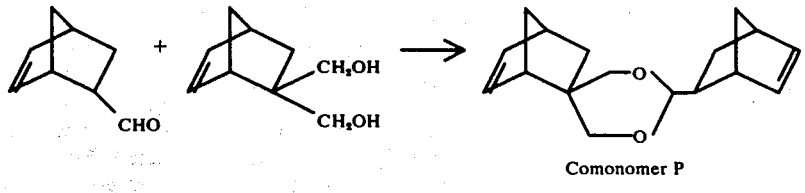

Comonomer P

The reaction mixture was washed successively with 1 liter of a 1 per cent sodium bisulfite solution and water and dried over anhydrous sodium sulfate. After filtering the sodium sulfate, the mixture was subjected to reduced pressure (40 mm) at 50° C. to remove the benzene. The remaining crude solid residue (377 grams; 94 per cent yield) melted at 144°-156° C. Recrystallization from methanol afforded a 56 per cent yield of a substantially pure white product having a melting point of 165°–168° C. The calculated carbon and hydrogen contents for the assigned structure of Comonomer P ($C_{17}H_{22}O_2$) are C, 79.03 and H, 8.58, weight per cent. Upon analysis, the carbon and hydrogen contents were found to be: C, 78.82 and H, 8.41 weight per cent.

2. Copolymerization of Copolymer P

A mixture containing 4.0 grams (0.155 mol) of Comonomer P and 4.0 grams (0.179 mole) of 3,4-dihydro-2H-pyran-2-methyl(3,4-dihydro-2H-pyran-2-carboxylate) was copolymerized at about 25° C. in the presence of 1.9 grams of a 10 weight per cent solution of $BF_3 \cdot O(C_2H_5)_2$ (13.40 moles × $10^4$) dissolved in diethylene glycol following the procedure described above with respect to Examples I–XXII. The polymerization induction time was 30 seconds and the polymerization peak exotherm was 145° C. reached in 360 seconds. The copolymer product was a hard, tough plaque which exhibited good abrasion resistance when scraped with a knife edge.

EXAMPLES XXII – XXXVII

In accordance with these examples, 3,4-dihydro-2H-pyran-2-methyl-(3,4-dihydro-2H-pyran-2-carboxylate), designated herein as Monomer $M_1$, was polymerized with the 2:1 adduct of 2-vinyl-4-(4-hydroxybutyl)-1,3-dioxolane and toluene diisocyanate, designated and described hereinabove as Comonomer I, under conditions such that foamed polymeric products were produced. In producing the foams of these examples, the monomers, trichloromonofluoromethane (blowing agent), silicone surfactant (foam stabilizer) and, when used, a phenolic compound were first preblended at ambient temperature in a one quart cardboard container for 30 seconds. The catalyst solution was then added and the mixture vigorously stirred for 20 seconds and quickly poured into a metal mole (8 × 8 × 6 inches) whereupon the respective reaction mixtures foamed and the cream, rise and tack-free times were recorded. The foams were then cured at room temperature for three days followed by testing according to standard ASTM procedures. The friability resistance of the foamed products was measured using a combination of ASTM C367 and C421 tumbling tests, that is, the test specimens were conditioned at room temperature in red oak cubes in accordance with ASTM C367, and the test time intervals (after 2 and 8 minute periods for a total of 10 minutes) were in compliance with ASTM C421. In most instances, friability resistance was also reported after a total test time of 20 minutes. Compressive strengths were determined using ASTM test method D1621. The relative proportions of Monomer $M_1$, Comonomer I, catalyst and other ingredients of the foam formulation, and the results obtained are set-forth in the following Table III. For the purpose of comparison, runs M-1 and M-2 are also included in Table III in accordance with which Monomer $M_1$ was homopolymerized under the indicated foaming conditions. In order to provide comparative data based on the preferred method for producing rigid foam from Monomer $M_1$, runs M-1 and M-2 were carried out using the phenolic compound, Bisphenol A, the presence of the phenolic compound providing foams having better friability properties than foams which are produced in the absence thereof.

TABLE III

Foamed Products of Di-(Dihydropyranyl)Monomer and 2-vinyl-4-(4-hydroxybutyl)-1,3-dioxolane/toluene diisocyanate Adduct

| Example No. | M-1 | M-2 | XXIX | XXX | XXXI | XXXII | XXXIII | XXXIV | XXXV | XXXVI | XXXVII |
|---|---|---|---|---|---|---|---|---|---|---|---|
| Foam Formulation, Parts by Weight | | | | | | | | | | | |
| Di-(dihydropyranyl) Monomer $M_1$/1/ | 76 | 76 | 36.8 | 33.8 | 37.5 | 47.4 | 38 | 33 | 42 | 40 | 30 |
| 1,3-Dioxolane, Comonomer I/2/ | — | — | 39 | 66.2 | 62.5 | 52.6 | 57 | 57 | 33 | 40 | 50 |
| Bisphenol A | 24 | 24 | 24.4 | — | — | — | 5 | 10 | 25 | 20 | 20 |
| 10 Weight % solution of $BF_3 \cdot O(C_2H_5)_2$ in Diethylene Glycol | 1.05 | 0.80 | 0.81 | 2.98 | 2.25 | 1.58 | 1.33 | 1.33 | 0.48 | 1.13 | 1.67 |
| Trichloromonofluoromethane | 17 | 17 | 18.86 | 17.25 | 16.28 | 13.71 | 15.95 | 15.95 | 14.95 | 15.67 | 15.85 |
| Silicone Surfactant A/3/ | 1.00 | 1.00 | 0.78 | 0.159 | 0.150 | — | 0.80 | 0.80 | 0.80 | 0.80 | 0.80 |
| Silicone Surfactant B/4/ | — | — | — | — | — | 3.98 | — | — | — | — | — |
| Foaming Properties | | | | | | | | | | | |
| Cream Time, Seconds | 25 | 50 | <10 | 37 | 37 | 45 | 40 | 28 | 17 | 20 | 10 |
| Rise Time, Seconds | 45 | 80 | 100 | 263 | 234 | 420 | 130 | 135 | 100 | 90 | 80 |
| Tack Free Time, Seconds | — | — | 100 | 139 | 224 | 325 | 177 | 250 | 167 | 81 | 85 |
| Foam Properties | | | | | | | | | | | |
| Core Density, pounds/cubic foot | 2.11 | 2.03 | 2.33 | 1.88 | 1.79 | 2.05 | 2.06 | 2.11 | 2.33 | 2.18 | 2.42 |
| Closed Cells, % | 90 | 89 | 91 | 85 | 85 | 84 | 90 | 88 | 92 | 88 | 86 |
| Compressive Strength, p.s.i. | | | | | | | | | | | |
| parallel to direction of rise | 35 | 33 | 35 | 19 | 25 | 24 | 30 | 30 | 39 | 33 | 26 |
| perpendicular to direction of rise | 8 | 14 | 12 | 7 | 8 | 11 | 10 | 9 | 14 | 10 | 11 |
| Friability | | | | | | | | | | | |
| Density, pounds/cubic foot | 1.97 | 1.87 | 2.14 | 1.80 | 1.98 | 1.97 | 1.88 | 1.74 | 2.18 | 1.78 | 1.95 |
| Weight loss, per cent | | | | | | | | | | | |
| After 2 minutes | 15 | 18 | 0.30 | 2.64 | 2.25 | 9.19 | 1.52 | 1.09 | 0.87 | 0.34 | 0.00 |
| After 10 minutes | 71 | 77 | 2.23 | 15.49 | 12.20 | 48.06 | 7.94 | 4.93 | 3.34 | 2.68 | 0.65 |
| After 20 minutes | 100 | 100 | 4.16 | 31.51 | 24.88 | 78.71 | 16.38 | 8.03 | 6.40 | 4.46 | 1.30 |

/1/3,4-dihydro-2H-pyran-2-methyl-(3,4-dihydro-2H-pyran-2-carboxylate).
/2/2:1 Adduct of 2-vinyl-4-(4-hydroxybutyl)-1,3-dioxolane and toluene diisocyanate.
/3/The foam stabilizer was a non hydrolyzable polyoxyethylene-polymethylsiloxane block copolymer containing an average number of about 7 oxyethylene units per polyoxyethylene block each such block being hydroxyl-terminated.
/4/Same type as Surfactant A except that the average number of oxyethylene units per polyoxyethylene block is about 16 and the latter blocks are methoxy-capped.

Inspection of the results shown in Table III above shows that the foamed copolymeric products produced in accordance with Examples XXIX – XXXVII exhibited improved friability resistance as compared with the foamed product obtained by the polymerization of the di-(dihydropyranyl) compound in the absence of the cyclic acetal comonomer. The improvement in friability resistance of the polymer products of this invention was obtained in the absence of the added phenolic compound, Bisphenol A (as in Examples XXX – XXXII), although friability was at a particularly low level in Examples XXIX and XXXIII–XXXVII in which the phenolic compound was present. It is noted that the excellent and markedly improved friability resistance of the rigid foams of these latter examples was obtained at a content of phenolic compound which was at about the same level or less than the amount present in comparative runs M-1 and M-2.

In another run presented for the purpose of comparison, Comonomer I, that is the 2:1 adduct of 2-vinyl-4-(4-hydroxybutyl)-1,3-dioxolane and toluene diisocyanate, was homopolymerized using the procedure employed in carrying out the runs of Table III in a reaction mixture containing 20 parts of Comonomer I, 2 parts of a ten weight per cent solution of $BF_3.O(C_2H_5)_2$ in diethylene glycol, 5 parts of trichloromonofluoromethane as blowing agent, and 0.2 parts of Surfactant A identified in Table III above. Although as demonstrated by the examples of Table III cyclic acetal Comonomer I provided a foamed product when copolymerized with the di-(dihydropyranyl) monomer, under the aforesaid conditions homopolymerization of Comonomer I did not provide a foamed product but rather a soft, tacky resin after standing for one day.

EXAMPLES XXXVIII–XLVIII

In accordance with these examples, the general procedure described above with reference to the examples of Table III was followed except that 3,4-dihydro-2H-pyran-2-methyl(3,4-dihydro-2H-pyran-2-carboxylate) was copolymerized with the reaction product of 2-vinyl-4-(4-hydroxybutyl)-1,3-dioxolane and polyphenylmethylene polyisocyanate, designated herein as Comonomer Q which was prepared as described below. In Examples XLIII-XLVIII, the monomer mixture also contained the 2:1 adduct of 2-vinyl-4-(4-hydroxybutyl)-1,3-dioxolane and toluene diisocyanate (Comonomer I herein).

Preparation of Comonomer Q

To 2-vinyl-4-(4-hydroxybutyl)-1,3-dioxolane (688 grams; 4.0 moles) dissolved in trichloromonofluoromethane (308 grams), there was added 540 grams (4.0 moles) of a polyphenylmethylene polyisocyanate having the following properties:
- Free NCO, per cent by weight.....30.5–32.3
- Isocyanato functionality (average)......2.70
- Viscosity, centipoises at 25° C. (maximum)...500
- Apparent specific gravity, 20/20° C....1.242
- Total acidity, % by weight as HCL (maximum)...0.50
- Flash point, ° F. (Cleveland Open Cup).....440
- Vapor pressure, mm. Hg at 20° C. ....<0.01

The relative proportions of monomers and the ingredients of the foam formulation, and the results obtained in carrying out these examples are given in the following Table IV.

TABLE IV

Foamed Products of Di-(Dihydropyranyl)Compound and 2-Vinyl-4-(4-Hydroxybutyl)-1,3-Dioxolane/Polyisocyanate Adducts

| Example No. | XXXVIII | XXXIX | XL | XLI | XLII | XLIII | XLIV | XLV | XLVI | XLVII | XLVIII |
|---|---|---|---|---|---|---|---|---|---|---|---|
| Foam Formulation, Parts by Weight | | | | | | | | | | | |
| Di-(dihydropyranyl) Monomer $M_1$/1/ | 45 | 37.5 | 30 | 45 | 45 | 45 | 45 | 45 | 30 | 41.7 | 26.7 |
| 1,3-Dioxolane, Comonomer Q/2/ | 55 | 62.5 | 70 | 45 | 35 | 25 | 35 | 30 | 35 | 21.7 | 31.7 |
| 1,3-Dioxolane, Comonomer I/3/ | — | — | — | — | — | 30 | 20 | 25 | 35 | 26.7 | 31.7 |
| Bisphenol A | — | — | — | 10 | 20 | — | — | — | — | 10 | 10 |
| 10 Weight % solution of $BF_3.O(C_2H_5)_2$ in Diethylene Glycol | 4.00 | 4.50 | 5.00 | 4.00 | 3.33 | 4.00 | 3.33 | 4.00 | 4.00 | 4.00 | 4.00 |
| Trichloromonofluoromethane | 17.7 | 16 | 17.7 | 15 | 15 | 15 | 15 | 15 | 17 | 15 | 16 |
| Silicone Surfactant/4/ | 0.80 | 0.80 | 0.80 | 0.80 | 0.80 | 0.80 | 0.80 | 0.80 | 0.80 | 0.80 | 0.80 |
| Foaming Properties | | | | | | | | | | | |
| Cream Time, Seconds | 54 | 88 | 48 | 27 | 16 | 45 | 57 | 50 | 55 | 21 | 25 |
| Rise Time, Seconds | 110 | 190 | 135 | 70 | 37 | 105 | 160 | 130 | 135 | 45 | 75 |
| Tack Free Time, Seconds | 75 | 118 | 130 | 44 | 25 | 60 | 80 | 65 | 95 | 26 | 50 |
| Foam Properties | | | | | | | | | | | |
| Core Density, pounds/cubic foot | — | 2.20 | — | 2.00 | 2.05 | 1.80 | — | 1.93 | 2.05 | 2.03 | 2.30 |
| Closed Cells, % | — | 87 | — | 89 | 84 | 83 | — | 84 | 87 | 80 | 84 |
| Compressive Strength, p.s.i. | | | | | | | | | | | |
| parallel to direction of rise | — | 26 | — | 27 | 19 | 16 | — | 17 | 20 | 15 | 20 |
| perpendicular to direction of rise | — | 7 | — | 8 | 10 | 5 | — | 7 | 7 | 7 | 10 |
| Friability | | | | | | | | | | | |
| Density, pounds/cubic foot | 1.72 | 2.00 | 1.69 | 1.82 | 1.82 | 1.56 | 1.93 | 2.15 | 2.15 | 1.93 | 2.57 |
| After 2 minutes | 1 | 0.2 | 0.4 | 0.5 | 0.7 | 0.0 | 1.32 | 0.0 | 0.0 | 0.0 | 0.0 |
| After 10 minutes | 12 | 8 | 8 | 8 | 7 | 10 | 10.86 | 3 | 3 | 4 | 0.4 |
| After 20 minutes | 28 | 19 | 19 | 16 | 16 | 25 | 24.01 | 7 | 7 | 10 | 3 |

/1/ 3,4-dihydro-2H-pyran-2-methyl(3,4-dihydro-2H-pyran-2-carboxylate).
/2,3/ Adducts of 2-vinyl-4-(4-hydroxybutyl)-1,3-dioxolane and toluene diisocyanate (Comonomer I) and polyphenylmethylene polyisocyanate (Comonomer Q).
/4/ Same as Surfactant A of Table III herein.

The results of Table IV further demonstrate that the friability resistance of the rigid foams produced by polymerization of the di-(dihydropyranyl) compound with cyclic acetal Comonomer Q or with a combination of Comonomer Q and Comonomer I in the presence as well as the absence of a phenolic compound, was significantly greater than that of the rigid foams produced by homopolymerization of Monomer $M_1$ in the presence of the phenolic compound as in comparative runs M-1 and M-2 of Table III.

EXAMPLES XLIX–LIV

In accordance with these examples, a series of foams were produced using 3,4-dihydro-2H-pyran-2-methyl(3,4-dihydro-2H-pyran-2-carboxylate) as the di-(dihydropyranyl)monomer, designated Monomer $M_1$, and the 2:1 adduct of 2-vinyl-5-hydroxymethyl-5-methyl-1,3-dioxane and toluene diisocyanate, described and designated hereinabove as Comonomer J. The foam formulation employed in these examples had the composition of Formulation A of the following Table V, no phenolic compound having been added.

TABLE V

| Component | Foam Formulation A Parts by Weight |
|---|---|
| Monomer $M_1$ | Varied (120–210) |
| Comonomer J | Varied (180–90) |
| 10 weight per cent solution of $BF_3 . O(C_2H_5)_2$ in diethylene glycol | 9.0 |

TABLE V-continued

| Component | Foam Formulation A Parts by Weight |
|---|---|
| Trichloromonofluoromethane | 50 |
| Silicone Surfactant (same as Surfactant A of Table III) | 2.4 |

In producing the foams of these examples, the general procedure followed was that described above with reference to the examples of Table III. The relative proportions of Monomer $M_1$ and Comonomer J and the results obtained are presented in Table VI below.

TABLE VI

Foamed Products of Di-(Dihydropyranyl)Monomer and Substituted 1,3-Dioxane

| Example No. | XLIX | L | LI | LII | LIII | LIV |
|---|---|---|---|---|---|---|
| Monomers, Parts by Weight | | | | | | |
| Di-(Dihydropyranyl) Monomer $M_1$/1/ | 210 | 180 | 165 | 150 | 135 | 120 |
| 1,3-Dioxane, Comonomer J/2/ | 90 | 120 | 135 | 150 | 165 | 180 |
| Weight per cent Ratio, $M_1$:J | 70:30 | 60:40 | 55:45 | 50:50 | 45:55 | 40:60 |
| Foaming Properties | | | | | | |
| Cream Time, Seconds | 45 | 38 | 28 | 22 | 22 | 30 |
| Rise Time, Seconds | 65 | 70 | 65 | 60 | 80 | 65 |
| Tack Free Time, Seconds | 52 | 50 | 35 | 35 | 38 | 50 |
| Foam Properties | | | | | | |
| Core Density, pounds/cubic foot | 1.71 | 1.63 | 1.71 | 1.65 | 1.73 | 1.85 |
| Closed Cells, % | 90 | 91 | 91 | 92 | 92 | 93 |
| Compressive Strength, p.s.i. | | | | | | |
| parallel to direction of rise | 27 | 29 | 32 | 32 | 34 | 33 |
| perpendicular to direction of rise | 12 | 12 | 11 | 10 | 11 | 13 |
| Friability | | | | | | |
| Density, pounds/cubic foot | 1.70 | 1.59 | 1.65 | 1.59 | 1.65 | 1.81 |
| Weight loss, per cent | | | | | | |
| After 2 minutes | 16 | 9 | 6 | 8 | 4 | 0.7 |
| After 10 minutes | 79 | 52 | 46 | 44 | 28 | 18 |

/1/ 3,4-dihydro-2H-pyran-2-methyl(3,4-dihydro-2-H-pyran-carboxylate),
/2/ 2:1 Adduct of 2-vinyl-5-hydroxymethyl-5-methyl-1,3-dioxane and toluene diisocyanate.

As shown by the results of Table VI above, stable, rigid foams were produced by the copolymerization of the di-(dihydropyranyl) compound and the 1,3-dioxanyl carbamate in the absence of any added phenolic compound. The friability resistance of the foamed products of Examples XLIX–LIV, in which no phenolic compound was used was about the same as, or significantly better than, the friability resistance of the homopolymeric di-(dihydropyranyl) product formed in runs M-1 and M-2 of Table III in which latter runs, however, a phenolic compound was used. The results of Table VI also indicate that the friability resistance of the foamed copolymeric products improved significantly as the concentration of the 1,3-dioxanyl monomer increased from 30 to 60 weight per cent of the monomer mixture.

EXAMPLES LV–LXI

In accordance with these examples, the general procedure described above with reference to the examples of Table III was followed except that 3,4-dihydro-2H-pyran-2-methyl(3,4-dihydro-2H-pyran-2-carboxylate) was copolymerized with isocyanate derivatives of 2,2-dimethyl-4-hydroxymethyl-1,3-dioxolane. In Examples LV–LVIII, the isocyanate derivative employed, designated herein as Comonomer R, was prepared by the reaction of polyphenylmethylene polyisocyanate and the aforesaid dimethylhydroxymethyl-1,3-dioxolane, as described below. In Examples LIX–LXI, the monomer mixture also contained the 2:1 adduct of the aforesaid dioxolane and toluene diisocyanate, designated and described hereinabove as Comonomer H.

PREPARATION OF COMONOMER R

To 2,2-dimethyl-4-hydroxymethyl-1,3-dioxolane (500 grams; 3.79 moles) in 253 grams of trichloromonofluoromethane there were added 512 grams (3.79 moles) of polyphenylmethylene polyisocyanate (having the properties given above with respect to the preparation of Comonomer Q), at 25° C. during a period of 40 minutes. When the addition was complete, the reaction mixture commenced to exotherm but the temperature was maintained at 25°–30° C. by means of a cooling bath, and was stirred at 25°–30° C. for 5 hours. The reaction product was used as such, without purification.

The composition of the foam formulation, relative proportions of monomers employed, and the results of these examples are set-forth in the following Table VII.

TABLE VII

Foamed Products of Di-(Dihydropyranyl) Compound and Isocyanate Reaction Products of 2,2-dimethyl-4-hydroxymethyl-1,3-dioxolane

| Example No. | LV | LVI | LVII | LVIII | LIX | LX | LXI |
|---|---|---|---|---|---|---|---|
| Foam Formulation, Parts by Weight | | | | | | | |
| Di-(dihydropyranyl) Monomer $M_1$/1/ | 50 | 50 | 50 | 50 | 50 | 50 | 50 |
| 1,3-Dioxolane, Comonomer R/2/ | 50 | 40 | 40 | 30 | 12.5 | 25 | 15 |
| 1,3-Dioxolane, Comonomer H/3/ | — | — | — | — | 37.5 | 25 | 15 |
| Bisphenol A | — | 10 | 10 | 20/5/ | — | — | 20/5/ |
| 10 Weight % solution of $BF_3.O(C_2H_5)_2$ in Diethylene Glycol | 3.67 | 3.00 | 2.67 | 3.67 | 2.50 | 2.67 | 3.00 |
| Trichloromonofluoromethane | 16.7 | 16.7 | 15.7 | 7 | 15.8 | 15 | 7 |
| Silicone Surfactant/4/ | 0.70 | 0.70 | 0.70 | 0.70 | 0.70 | 0.70 | 0.70 |
| Foaming Properties | | | | | | | |
| Cream Time, Seconds | 67 | 25 | 28 | 84 | 58 | 61 | 81 |

TABLE VII-continued

Foamed Products of Di-(Dihydropyranyl) Compound and Isocyanate Reaction Products of 2,2-dimethyl-4-hydroxymethyl-1,3-dioxolane

| Example No. | LV | LVI | LVII | LVIII | LIX | LX | LXI |
|---|---|---|---|---|---|---|---|
| Rise Time, Seconds | 120 | 60 | 57 | 120 | — | 150 | 150 |
| Tack Free Time, Seconds | 77 | 37 | 37 | 94 | 88 | 87 | 100 |
| Foam Properties | | | | | | | |
| Core Density, pounds/cubic foot | 2.23 | 2.03 | 2.26 | — | 2.60 | 2.56 | — |
| Closed cells, % | 94 | 93 | 95 | — | 92 | 92 | — |
| Compressive Strength, p.s.i. | | | | | | | |
| parallel to direction of rise | 33 | 37 | 44 | — | 38 | 26 | — |
| perpendicular to direction of rise | 18 | 11 | 18 | — | 21 | 22 | — |
| Friability | | | | | | | |
| Density, pounds/cubic foot | 2.32 | 2.10 | 2.34 | 1.95 | 2.33 | 2.53 | 1.81 |
| Weight loss, per cent | | | | | | | |
| After 2 minutes | 8 | 3 | 3 | 2 | 2 | 12 | 2 |
| After 10 minutes | 54 | 25 | 22 | 19 | 74 | 61 | 12 |
| After 20 minutes | 88 | 45 | 43 | 39 | 99 | 92 | 26 |

/1/3,4-dihydro-2H-pyran-2-methyl-(3,4-dihydro-2H-pyran-2-carboxylate).
/2/Adduct of 2,2-dimethyl-4-hydroxymethyl-1,3-dioxolane and polyphenylmethylene polyisocyanate.
/3/2:1 adduct of 2,2-dimethyl-4-hydroxymethyl-1,3-dioxolane and toluene diisocyanate.
/4/Same as Surfactant A of Table III herein.
/5/In place of Bisphenol A, the phenolic compound employed was a phenolic resole resin.

Comparison of the results of Table VII with comparative runs M-1 and M-2 of Table III shows that the friability resistance of the foamed products of Examples LV, LIX and LX in which no phenolic compound was used, was about the same as or somewhat better than that of the foamed products of comparative runs M-1 and M-2 in which, however, a phenolic compound was used. On the other hand, in Examples LVI-LVIII and LXI in which a phenolic compound was also used, the friability resistance of the respective copolymeric and terpolymeric products was improved at least two-fold.

What is claimed is:

1. A process for producing cellular polymerization products which comprises reacting and foaming a reaction mixture comprising: (a) a di-(3,4-dihydro-2H-pyranyl) compound, (b) a hydroxyl-substituted 1,3-cyclic acetal or an ester condensation product of said hydroxyl-substituted 1,3-cyclic acetal and a dicarboxylic acid, in which the cyclic nucleus of said 1,3-cyclic acetal consists of from three to four carbon atoms in addition to the two oxygen atoms at the 1- and 3-positions thereof, (c) a cationic polymerization catalyst, and (d) a blowing agent.

2. A process as defined in claim 1 wherein said catalyst comprises boron trifluoride.

3. A process as defined in claim 1 wherein the reaction mixture contains a phenolic compound.

4. A process as defined in claim 1 wherein said di-(3,4-dihydro-2H-pyranyl) compound is 3,4-dihydro-2H-pyran-2-methyl(3,4-dihydro-2H-pyran-2-carboxylate).

5. A cellular product produced in accordance with the process of claim 1.

6. A process as defined in 1 wherein said hydroxyl-substituted 1,3-cyclic acetal is a hydroxyalkylmono-1,3-dioxolane.

7. A process as defined in claim 6 in which said hydroxyalkyl-mono-1,3-dioxolane is 2,2-dimethyl-4-hydroxymethyl-1,3-dioxolane.

8. A process as defined in claim 6 in which said hydroxyalkyl-mono-1,3-dioxolane is 2-vinyl-4-(4-hydroxybutyl)-1,3-dioxolane.

9. A process as defined in claim 1 in which said hydroxyl-substituted 1,3-cyclic acetal is a hydroxyalkyl-mono-1,3-dioxane.

10. A process as defined in claim 9 in which said hydroxyalkyl-mono-1,3-dioxane is 2-vinyl-5-hydroxymethyl-5-methyl-1,3-dioxane.

11. A process as defined in claim 1 in which said hydroxyl-substituted 1,3-cyclic acetal is a hydroxy-bis-(1,3-dioxolanyl)alkane.

12. A process as defined in claim 1 in which said hydroxyl-substituted 1,3-cyclic acetal is a hydroxybis(1,3-dioxanyl)alkane.

13. A process as defined in claim 1 in which said dicarboxylic acid is a phthalic acid or a halogen-substituted phthalic acid.

14. A process as defined in claim 1 in which said dicarboxylic acid is chlorendic acid.

* * * * *

UNITED STATES PATENT OFFICE
CERTIFICATE OF CORRECTION

Patent No. 4,009,129　　　　　Dated February 22, 1977

Inventor(s) Anthony Joseph Papa and William Robert Proops

It is certified that error appears in the above-identified patent and that said Letters Patent are hereby corrected as shown below:

Column 1, line 8, for "which" read -- in turn --. Column 2, line 56, for "in" read -- is --. Column 4, lines 33-34, the formula bridging these two lines should read -- $X"(C_nH_{2n})-X"$ --; line 43, for "-dihyro-" read -- -dihydro- --; line 63, for "Smoth" read -- Smith --. Column 7, line 54, for "dioxyanyl" read -- dioxanyl --. Column 8, line 10, for "when" read -- When --; line 13, for "stucture" read -- structure --. Column 12, line 42, for the subscript "1" read the subscript -- i --. Column 18, line 25, after "5'-" read -- dibromo-4'- --. Columns 21-22, as the heading to the table, read -- Table I --; under the column headed "$M_1+M_2$", for the eighth numerical entry "354", read -- 345 --; opposite the left-hand legend "XIII", for the second numerical entry "0.016" read -- 0.106 --. Columns 29-30, lines 1-14, that portion of the formula reading

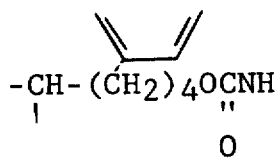　　should read　　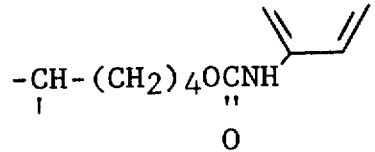

UNITED STATES PATENT OFFICE
CERTIFICATE OF CORRECTION

Patent No. 4,009,129        Dated February 22, 1977

Inventor(s) Anthony Joseph Papa and William Robert Proops

It is certified that error appears in the above-identified patent and that said Letters Patent are hereby corrected as shown below:

Columns 29-30, immediately under line 16, delete "(1) Preparation of 2-ethylacrylate-4-(4-hydroxybutyl)-1,3-dioxalane". Column 31, line 25, for "XXII" read -- XXIX --. Column 34, line 7, for "HCL" read -- HCl --.

Signed and Sealed this second Day of August 1977

[SEAL]

Attest:

RUTH C. MASON
Attesting Officer

C. MARSHALL DANN
Commissioner of Patents and Trademarks